US012162789B2

(12) United States Patent
Amosov et al.

(10) Patent No.: US 12,162,789 B2
(45) Date of Patent: Dec. 10, 2024

(54) METHODS AND APPARATUS FOR FORMING LAMINATED GLASS SHEETS

(71) Applicant: CORNING INCORPORATED, Corning, NY (US)

(72) Inventors: Alexey Sergeyevich Amosov, Avon (FR); Olivier Fournel, Yerres (FR); Michael Charles Gerrish, Corning, NY (US); Patrick Paul Gill, Watkins Glen, NY (US); Vladislav Yuryevich Golyatin, Avon (FR); Joseph Michael Matusick, Corning, NY (US); Andrey Yuryevich Ushakov, St. Petersburg (RU)

(73) Assignee: CORNING INCORPORATED, Corning, NY (US)

( * ) Notice: Subject to any disclaimer, the term of this patent is extended or adjusted under 35 U.S.C. 154(b) by 839 days.

(21) Appl. No.: 17/267,065

(22) PCT Filed: Aug. 8, 2019

(86) PCT No.: PCT/US2019/045644
§ 371 (c)(1),
(2) Date: Feb. 9, 2021

(87) PCT Pub. No.: WO2020/033638
PCT Pub. Date: Feb. 13, 2020

(65) Prior Publication Data
US 2021/0163332 A1 Jun. 3, 2021

Related U.S. Application Data

(60) Provisional application No. 62/876,090, filed on Jul. 19, 2019, provisional application No. 62/717,173, filed on Aug. 10, 2018.

(51) Int. Cl.
*C03B 17/06* (2006.01)
*B32B 17/06* (2006.01)
*C03B 25/12* (2006.01)

(52) U.S. Cl.
CPC ............ *C03B 17/064* (2013.01); *B32B 17/06* (2013.01); *C03B 17/067* (2013.01); *C03B 25/12* (2013.01)

(58) Field of Classification Search
CPC ........ C03B 23/203; C03B 17/02; B32B 17/06
See application file for complete search history.

(56) References Cited

U.S. PATENT DOCUMENTS 2,422,466 A    6/1947  Brown
3,149,949 A *  9/1964  Dockerty .............. C03B 17/064
                                                      65/195
(Continued)

FOREIGN PATENT DOCUMENTS

CN    107207315 A    9/2017
KR   2016-0063355 A  6/2016
(Continued)

OTHER PUBLICATIONS

Taiwanese Patent Application No. 108128550, Office Action dated May 31, 2023, 2 pages (English Translation Only); Taiwanese Patent Office.
(Continued)

*Primary Examiner* — Alison L Hindenlang
*Assistant Examiner* — Steven S Lee
(74) *Attorney, Agent, or Firm* — Daniel J. Greenhalgh

(57) ABSTRACT

A forming body of a glass forming apparatus may include a first conduit comprising a first conduit wall and at least one slot in the first conduit wall, and a second conduit disposed above and vertically aligned with the first conduit, the second conduit comprising a second conduit wall and a slot
(Continued)

extending through the second conduit wall. The forming body may include a first vertical wall and a second vertical wall extending between an outer surface of the second conduit wall and an outer surface of the first conduit wall at a first side and a second side, respectively, of the forming body. The forming body may include a first forming surface and a second forming surface extending from an outer surface of the first conduit wall and converging at a root of the forming body. Methods of forming a continuous laminate glass ribbon are also disclosed.

11 Claims, 12 Drawing Sheets

(56) References Cited

U.S. PATENT DOCUMENTS

| | | | |
|---|---|---|---|
| 3,338,696 A | 8/1967 | Dockerty | |
| 3,467,513 A | 9/1969 | Dockerty | |
| 3,607,182 A * | 9/1971 | Leibowitz | C03B 17/064 65/195 |
| 4,214,886 A * | 7/1980 | Shay | B32B 17/06 65/121 |
| 4,268,296 A | 5/1981 | Pfaender | |
| 6,224,805 B1 | 5/2001 | Fields et al. | |
| 6,997,017 B2 | 2/2006 | Pitbladdo | |
| 7,514,149 B2 | 4/2009 | Bocko et al. | |
| 9,556,052 B2 | 1/2017 | De Angelis et al. | |
| 9,796,616 B2 | 10/2017 | Coppola et al. | |
| 2001/0039814 A1 | 11/2001 | Pitbladdo | |
| 2004/0197575 A1* | 10/2004 | Bocko | C03B 17/062 428/432 |
| 2006/0127679 A1* | 6/2006 | Gulati | C03B 17/02 428/428 |
| 2012/0227445 A1 | 9/2012 | Citti et al. | |
| 2013/0312459 A1* | 11/2013 | Coppola | C03B 17/064 65/195 |
| 2014/0238079 A1* | 8/2014 | Amosov | C03B 17/02 65/53 |
| 2015/0274568 A1 | 10/2015 | Kazmierczak et al. | |
| 2016/0159677 A1 | 6/2016 | Coppola et al. | |
| 2016/0185643 A1 | 6/2016 | Kersting | |
| 2017/0073266 A1* | 3/2017 | Amosov | C03C 3/091 |
| 2017/0282503 A1 | 10/2017 | Peng et al. | |
| 2018/0162768 A1 | 6/2018 | Boek et al. | |
| 2021/0300808 A1* | 9/2021 | Amosov | C03B 17/064 |

FOREIGN PATENT DOCUMENTS

| | | | |
|---|---|---|---|
| TW | 201236990 A | 9/2012 | |
| TW | 201512112 A | 4/2015 | |
| TW | 202019837 A | 6/2020 | |
| WO | WO-2015016935 A1 * | 2/2015 | C03B 17/02 |
| WO | WO-2016033038 A1 * | 3/2016 | B32B 17/06 |
| WO | WO-2016178966 A1 * | 11/2016 | B32B 17/06 |
| WO | 2016/196534 A1 | 12/2016 | |
| WO | WO-2017087585 A1 * | 5/2017 | B32B 17/06 |
| WO | 2017/184544 A1 | 10/2017 | |
| WO | 2020/033387 A1 | 2/2020 | |

OTHER PUBLICATIONS

International Search Report and Written Opinion of the International Searching Authority; PCT/US19/45278; Mailed Oct. 23, 2019; 11 Pages; European Patent Office.

International Search Report and Written Opinion of the International Searching Authority; PCT/US19/45644; Mailed Nov. 1, 2019; 6 Pages; Commissioner for Patents.

* cited by examiner

METHODS AND APPARATUS FOR FORMING LAMINATED GLASS SHEETS

CROSS-REFERENCE TO RELATED APPLICATIONS

This application claims the benefit of priority under 35 U.S.C. § 371 of International Application No. PCT/US2019/045644, filed on Aug. 8, 2019, which claims the benefit of priority of U.S. Provisional Application Ser. No. 62/717,173 filed on Aug. 10, 2018 and U.S. Provisional Application Ser. No. 62/876,090 filed on Jul. 19, 2019, the contents of which are relied upon and incorporated herein by reference in their entirety as if fully set forth below.

BACKGROUND

Field

The present specification generally relates to methods and apparatuses for forming glass sheets and, more specifically, to forming bodies and methods for forming continuous laminate glass ribbons having a plurality of glass layers.

Technical Background

The fusion process is one technique for forming continuous glass ribbons. Compared to other processes for forming glass ribbons, such as the float and slot-draw processes, the fusion process produces glass ribbons with a relatively low amount of defects and with surfaces having superior flatness. As a result, the fusion process is widely employed for the production of glass substrates used in the manufacture of LED and LCD displays and other substrates that require superior flatness. In the fusion process molten glass is fed into a forming body (also referred to as an isopipe), which includes forming surfaces that converge at a root. The molten glass evenly flows over the forming surfaces of the forming body and forms a ribbon of flat glass with pristine surfaces that is drawn from the root of the forming body.

Laminating a plurality of different glass compositions together to produce laminate glass sheets can provide different properties to glass sheets, such as improved strength or various optical properties. Laminate glass sheets have been made by a fusion process using a double overflow isopipe, which includes two or more overflow isopipes arranged in a vertical relationship, each overflow isopipe having two weirs over which the molten glass overflows. However, some double overflow isopipe designs may limit the glass compositions that can be incorporated into the laminate glass sheets or have other challenges overcome by technology disclosed herein.

Accordingly, a need exists for alternative apparatuses and methods for producing continuous laminate glass ribbons using fusion process technology.

SUMMARY

In a first aspect of the present disclosure, a forming body of a glass forming apparatus is disclosed that may comprise a first conduit comprising a first conduit wall having an interior surface defining a first region and at least one slot extending through the first conduit wall and in fluid communication with the first region. The at least one slot of the first conduit may have a longest dimension aligned with a direction of flow through the first conduit. The forming body may further include a second conduit disposed above and vertically aligned with the first conduit, the second conduit comprising a second conduit wall having an interior surface defining a second region and at least one slot extending through the second conduit wall and in fluid communication with the second region. The at least one slot of the second conduit may have a longest dimension aligned with a direction of flow through the second conduit. The forming body may further include a first vertical wall extending between an outer surface of the second conduit wall and an outer surface of the first conduit wall at a first side of the forming body and a second vertical wall extending between the outer surface of the second conduit wall and the outer surface of the first conduit wall at a second side of the forming body. The forming body may further include a first forming surface and a second forming surface extending from an outer surface of the first conduit wall. The first forming surface and the second forming surface may converge at a root of the forming body.

A second aspect of the present disclosure may include the first aspect, wherein the first conduit may comprise a first slot extending through the first conduit wall proximate the first side of the forming body and a second slot extending through the second conduit wall proximate the second side of the forming body opposite the first side of the forming body.

A third aspect of the present disclosure may include either the first or the second aspect, wherein the at least one slot of the second conduit may extend through the second conduit wall at an uppermost portion of the second conduit wall so that molten glass flowing through the at least one slot in the second conduit wall flows down the first side and the second side of the forming body.

A fourth aspect of the present disclosure may include either the first or the second aspect, wherein the second conduit may include a first slot extending through the second conduit wall at the first side of the forming body and a second slot extending through the second conduit wall at the second side of the forming body.

A fifth aspect of the present disclosure may include the first aspect, wherein the first conduit may include a single slot disposed on the first side of the forming body, and the second conduit may include a single slot disposed on the second side of the forming body opposite the first side.

A sixth aspect of the present disclosure may include any of the first through fifth aspects, wherein the first vertical wall, the second vertical wall, or both, may be configured so that a second molten glass flow from the second conduit maintains contact with the forming body until it contacts a first molten glass flow from the first conduit.

A seventh aspect of the present disclosure may include any of the first through sixth aspects, wherein the first vertical wall, the second vertical wall, or both may be configured so that a second molten glass flow from the second conduit does not free fall over a distance between the second conduit and the first conduit.

An eighth aspect of the present disclosure may include any of the first through seventh aspects, wherein the first vertical wall outer surface may be spaced horizontally outward relative to the outer surface of the first conduit wall proximate the at least one slot in the first conduit wall so that the first vertical wall outer surface is vertically offset from the outer surface of the first conduit wall.

A ninth aspect of the present disclosure may include the eighth aspects, wherein the vertical offset may be configured so that deformation of a second molten glass flow from the second conduit is reduced at a confluence of the second molten glass flow with a first molten glass flow from the first conduit.

A tenth aspect of the present disclosure may include either of the eighth or ninth aspects, wherein the vertical offset may be less than or equal to a thickness of a core layer of a laminated glass sheet formed with the forming body.

An eleventh aspect of the present disclosure may include any one of the first through tenth aspects, wherein each of the at least one slot in the first conduit wall, each of the at least one slot in the second conduit wall, or combinations thereof, may include a plurality of slots. Each of the plurality of slots may be aligned along a linear path parallel to the flow direction of the first conduit or the second conduit, respectively.

A twelfth aspect of the present disclosure may include any one of the first through eleventh aspects, wherein the forming body may further comprise at least one supplemental conduit disposed above and vertically aligned with the first conduit and the second conduit. The at least one supplemental conduit may have a supplemental conduit wall having an interior surface defining a supplemental region and at least one slot extending through the supplemental conduit wall. The at least one slot of the supplemental conduit may have a longest dimension aligned with a direction of flow through the supplemental conduit. The forming body may further include a plurality of supplemental vertical walls extending between the outer surface of the second conduit and an outer surface of the at least one supplemental conduit.

A thirteenth aspect of the present disclosure may include the twelfth aspect, comprising a plurality of supplemental conduits and a plurality of supplemental vertical walls, each of which may extend between two of the plurality of supplemental conduits.

A fourteenth aspect of the present disclosure may include any one of the first through thirteenth aspects, comprising a forming surface support comprising a first conduit support surface, the first forming surface, and the second forming surface. The first conduit support surface may be configured to support a lower portion of the first conduit wall.

A fifteenth aspect of the present disclosure may include the fourteenth aspect, wherein the forming surface support may comprise a refractory material support and a refractory metal layer disposed on the refractory material support to form at least the first forming surface and the second forming surface.

A sixteenth aspect of the present disclosure may include any one of the first through fifteenth aspects, further comprising a conduit support disposed between the first conduit and the second conduit. The conduit support may include a top surface and a bottom surface.

A seventeenth aspect of the present disclosure may include the sixteenth aspect, wherein the top surface of the conduit support may be shaped to support a lower portion of the second conduit wall, and the bottom surface may be shaped to receive an upper portion of the first conduit wall.

An eighteenth aspect of the present disclosure may include either the sixteenth or seventeenth aspects, wherein the conduit support may comprise a refractory material.

A nineteenth aspect of the present disclosure may include any one of the sixteenth through eighteenth aspects, wherein the first vertical wall may be coupled to a first side of the conduit support, and the second vertical wall may be coupled to a second side of the conduit support.

A twentieth aspect of the present disclosure may include any of the first through nineteenth aspects, wherein the first conduit wall, the second conduit wall, the first vertical wall, and the second vertical wall comprise a refractory metal.

A twenty-first aspect of the present disclosure may include the twentieth aspect, wherein the refractory metal comprises platinum or a platinum alloy.

A twenty-second aspect of the present disclosure may include any of the first through twenty-first aspects, in which a glass forming apparatus may include the forming body according to any of the first through twenty-first aspects. The glass forming apparatus may further include a first glass delivery system in fluid communication with an inlet of the first conduit and a second glass delivery system in fluid communication with an inlet of the second conduit.

A twenty-third aspect of the present disclosure may be directed to a method of forming a laminated glass ribbon having a plurality of glass layers. The method may include flowing a first molten glass into a first conduit in a forming body, the first conduit comprising a first conduit wall having an interior surface defining a first region and at least one slot extending through the first conduit wall and in fluid communication with the first region. The at least one slot of the first conduit may have a longest dimension aligned with a direction of flow through the first conduit. The method may further include passing the first molten glass through the at least one slot in the first conduit wall to merge with a first glass flow on a first side of the forming body, a second side of the forming body, or both. The method may further include flowing a second molten glass into a second conduit in the forming body. The second conduit may be positioned above and vertically aligned with the first conduit and may comprise a second conduit wall having an interior surface defining a second region and at least one slot extending through the second conduit wall and in fluid communication with the second region. The at least one slot of the second conduit may have a longest dimension aligned with a direction of flow through the second conduit. The method may further include passing the second molten glass through the at least one slot in the second conduit wall to merge with a second glass flow on the first side of the forming body, the second side of the forming body, or both. The method may further include merging the second glass flow with the first glass flow to form a continuous laminate glass ribbon having a plurality of molten glass layers fused together and drawing the continuous laminate glass ribbon downward from a root of the forming body.

A twenty-fourth aspect of the present disclosure may include the twenty-third aspect, wherein the method may comprise merging the second glass flow with the first glass flow at the root.

A twenty-fifth aspect of the present disclosure may include the twenty-third aspect, wherein the method may comprise merging the second glass flow with the first glass flow proximate the at least one slot in the first conduit wall on the first side of the forming body, the second side of the forming body, or both.

A twenty-sixth aspect of the present disclosure may include any one of the twenty-third through twenty-fifth aspects, wherein the first molten glass may have a glass composition different from a glass composition of the second molten glass.

A twenty-seventh aspect of the present disclosure may include any one of the twenty-third through twenty-sixth aspects, wherein the first glass flow may form a core glass, and the second glass flow may form a clad glass.

A twenty-eighth aspect of the present disclosure may include any one of the twenty-third through twenty-seventh aspects, wherein the first conduit may comprise a first slot extending through the first conduit wall at the first side of the forming body and a second slot extending through the first conduit wall at the second side of the forming body. The method may further include passing the first molten glass through the first slot to merge with a first portion of the first glass flow on the first side of the forming body, and passing the first molten glass through the second slot to merge with a second portion of first glass flow on the second side of the forming body. The method may further include merging the first portion of the first glass flow and the second portion of the first glass flow at the root to form a fused layer of molten glass.

A twenty-ninth aspect of the present disclosure may include any one of the twenty-third through twenty-eighth aspects, in which the method may further include annealing the continuous laminate glass ribbon.

A thirtieth aspect of the present disclosure may include any one of the twenty-third through twenty-ninth aspects, in which the method may further comprise separating the continuous laminate glass ribbon into a plurality of laminated glass sheets.

A thirty-first aspect of the present disclosure may include any one of the twenty-third through thirtieth aspects, in which the method may further include flowing a third molten glass into a third conduit in the forming body. The third conduit may be positioned above and vertically aligned with the first conduit and second conduit. The third conduit may comprise a third conduit wall having an interior surface defining a third region and at least one slot extending through the third conduit wall and in fluid communication with the third region. The at least one slot of the third conduit may have a longest dimension aligned with a direction of flow through the third conduit. The method may further include passing the third molten glass through the at least one slot in the third conduit wall to merge with a third glass flow on a first side of the forming body, a second side of the forming body, or both, and merging the third glass flow with the second glass flow, the first gas flow, or both.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 3:
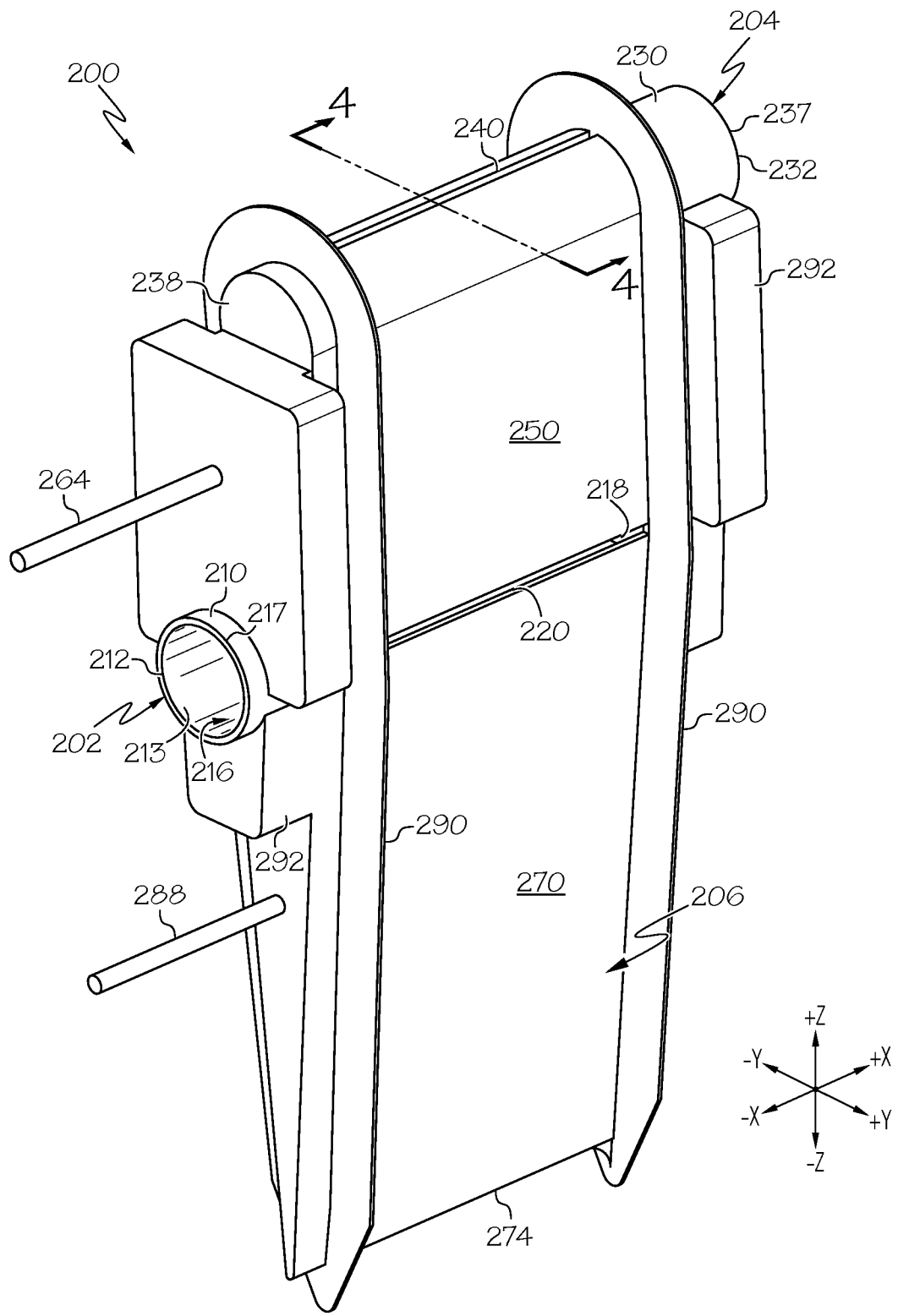
FIG. 3 schematically depicts a perspective view of a forming body for use with the laminate glass forming apparatus of FIG. 1 and having a plurality of conduits, according to one or more embodiments shown and described herein.
Figure 4:
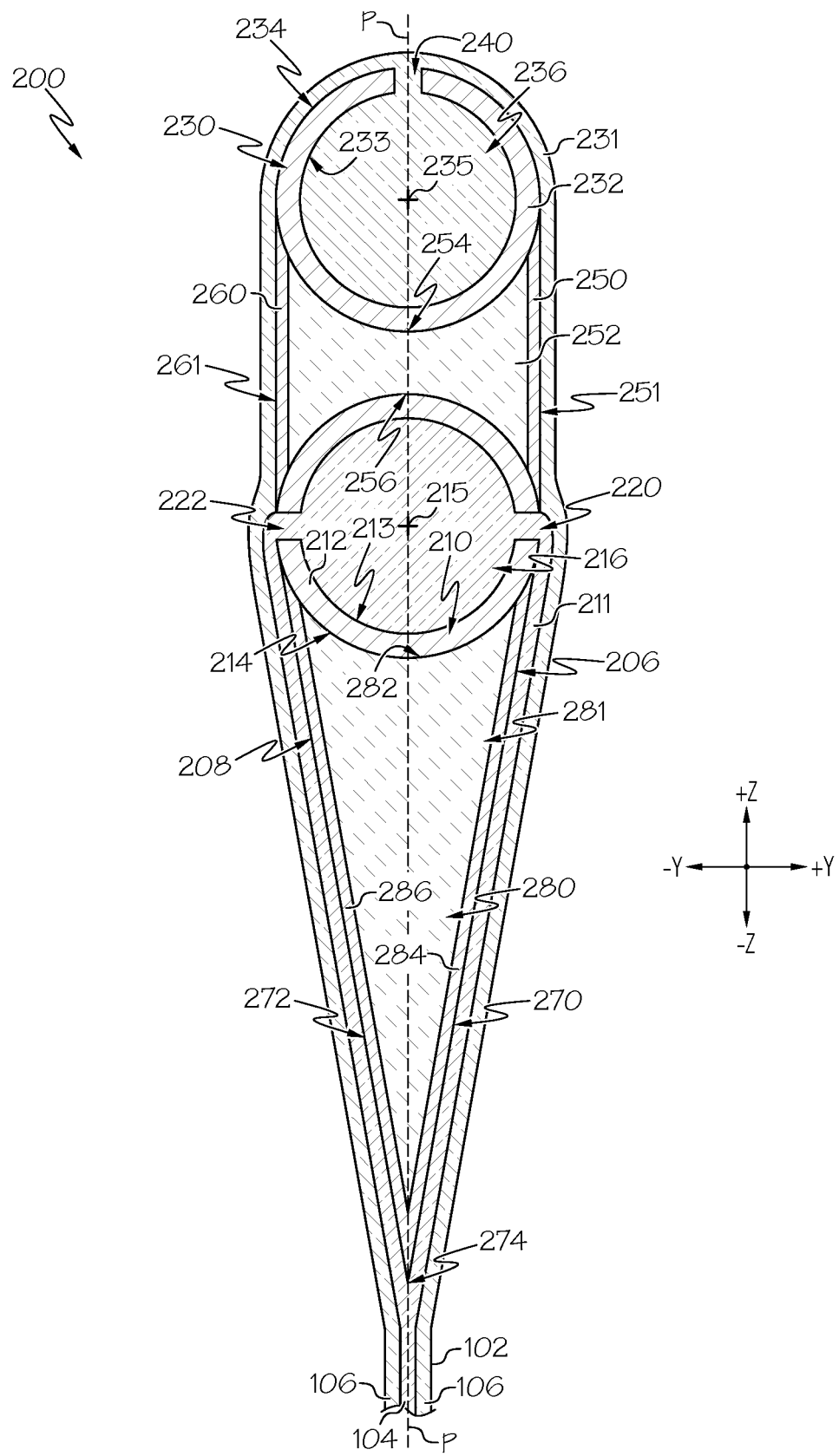
FIG. 4 schematically depicts a cross-sectional view of the forming body of FIG. 3 taken along section line 4-4, according to one or more embodiments shown and described herein.
Figure 5:
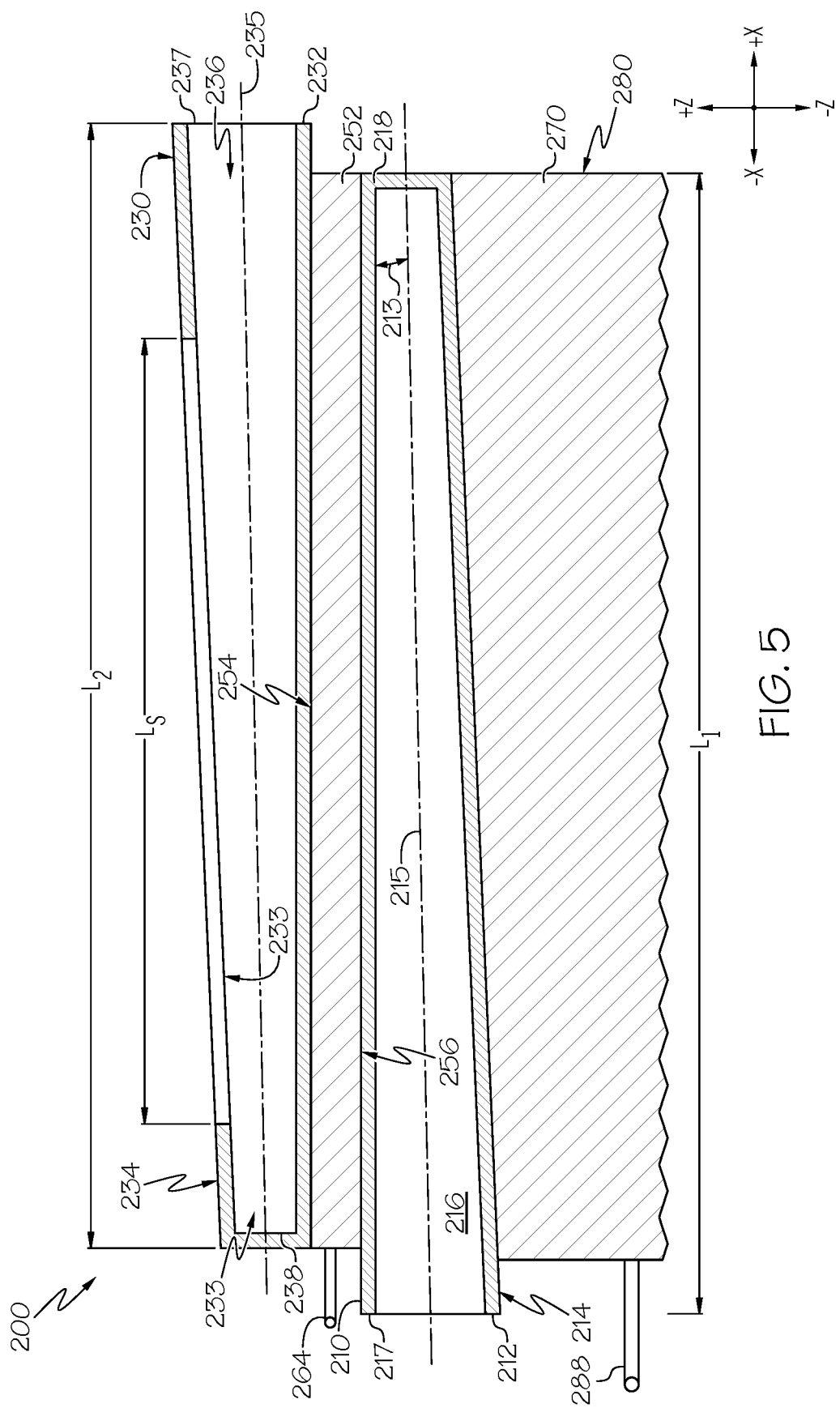
FIG. 5 schematically depicts a side cross-sectional view of the forming body of FIG. 3, according to one or more embodiments shown and described herein.

Reference will now be made in detail to embodiments of forming bodies for glass forming apparatuses for producing continuous laminate glass ribbons, examples of which are illustrated in the accompanying drawings. Whenever possible, the same reference numerals will be used throughout the drawings to refer to the same or like parts. One embodiment of a forming body 200 of a glass forming apparatus is schematically depicted in FIGS. 3-5. In this embodiment, the forming body 200 of a glass forming apparatus includes a first conduit 210 that may include a first conduit wall 212 having an interior surface 213 defining a first region 216 and at least one slot (e.g., first slot 220 and/or second slot 222; narrow aperture, elongate opening, opening with aspect ratio of at least 5:1, 10:1, 20:1, 50:1, or more or less for narrowest to widest cross section; may be oval, elliptical, rectangular, or other geometries as disclosed) extending through the first conduit wall 212 and in fluid communication with the first region 216. The slot of the first conduit 210 may have a longest dimension aligned with a direction of flow through the first conduit 210. The forming body 200 of FIG. 3 further includes a second conduit 230 disposed above and vertically aligned with the first conduit 210. The second conduit 230 may include a second conduit wall 232 having an interior surface 233 defining a second region 236 and at least one slot 240 extending through the second conduit wall 232 and in fluid communication with the second region 236. The slot 240 of the second conduit 230 may have a longest dimension aligned with a direction of flow through the second conduit 230. The forming body 200 may further include a first vertical wall 250 and a second vertical wall 260, each of which extend between an outer surface 234 of the second conduit wall 232 and an outer surface 214 of the first conduit wall 210 at a first side 206 and a second side 208, respectively, of the forming body 200. The forming body 200 may further include a first forming surface 270 and a second forming surface 272 extending from the outer surface 214 of the first conduit wall 212. The first forming surface 270 and the second forming surface 272 converge at a root 274 of the forming body 200. The forming bodies 200 of the present disclosure may enable the glass viscosity and glass flow distribution to be independently controlled, which may expand the possible combinations of glass compositions capable of being incorporated into the continuous laminate glass ribbon 102. Additionally, the forming body 200 may provide a more stable confluence between the molten glass flows, which may reduce defects in the glass layers, among other aspects.

Directional terms as used herein—for example vertically, vertical, horizontal, horizontally, up, down, right, left, front, back, top, bottom—are made only with reference to the figures as drawn to facilitate the present disclosure and are not intended to imply absolutes or precise orientation unless expressly provided. For example, a "vertical" element may be oriented 80° from a "horizontal" element. Ranges of angles between vertical and horizontal elements may be 70° to 110° for example, such as 80° to 100°. Other such directional terms or terms with geometric meanings may also vary from absolute mathematical definitions. For example, "parallel" refers to side-by-side alignment in generally the same direction even if slightly offset, such as within 10° of one another. Likewise, "linear" is generally straight, not necessarily perfectly straight or always straight unless expressly provided.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes embodiments having two or more such components, unless the context clearly indicates otherwise.

The glass forming apparatus 100 and forming bodies disclosed herein may be employed to produce continuous laminate glass ribbons 102 for making laminate glass sheets. Continuous laminate glass ribbons 102 and laminate glass sheets made therefrom may include a plurality of glass layers, such as 2, 3, 4, 5, 6, or more than 6 layers of glass. In some embodiments, the continuous laminate glass ribbon 102 may include a core glass layer and at least two clad glass layers, where the core glass layer is disposed between the two clad glass layers. Each of the layers of glass may be fused together. In some embodiments, one or more of the glass layers may have a different glass composition than the other glass layers. The different glass compositions in the different glass layers may have different properties, such as coefficients of thermal expansion (CTE), Young's modulus, optical properties, chemical resistance, or other properties, which may provide certain features, such as improved strength, modified optical properties, or other features, to the laminated glass sheets produced from the continuous laminate glass ribbons 102.

Figure 1:
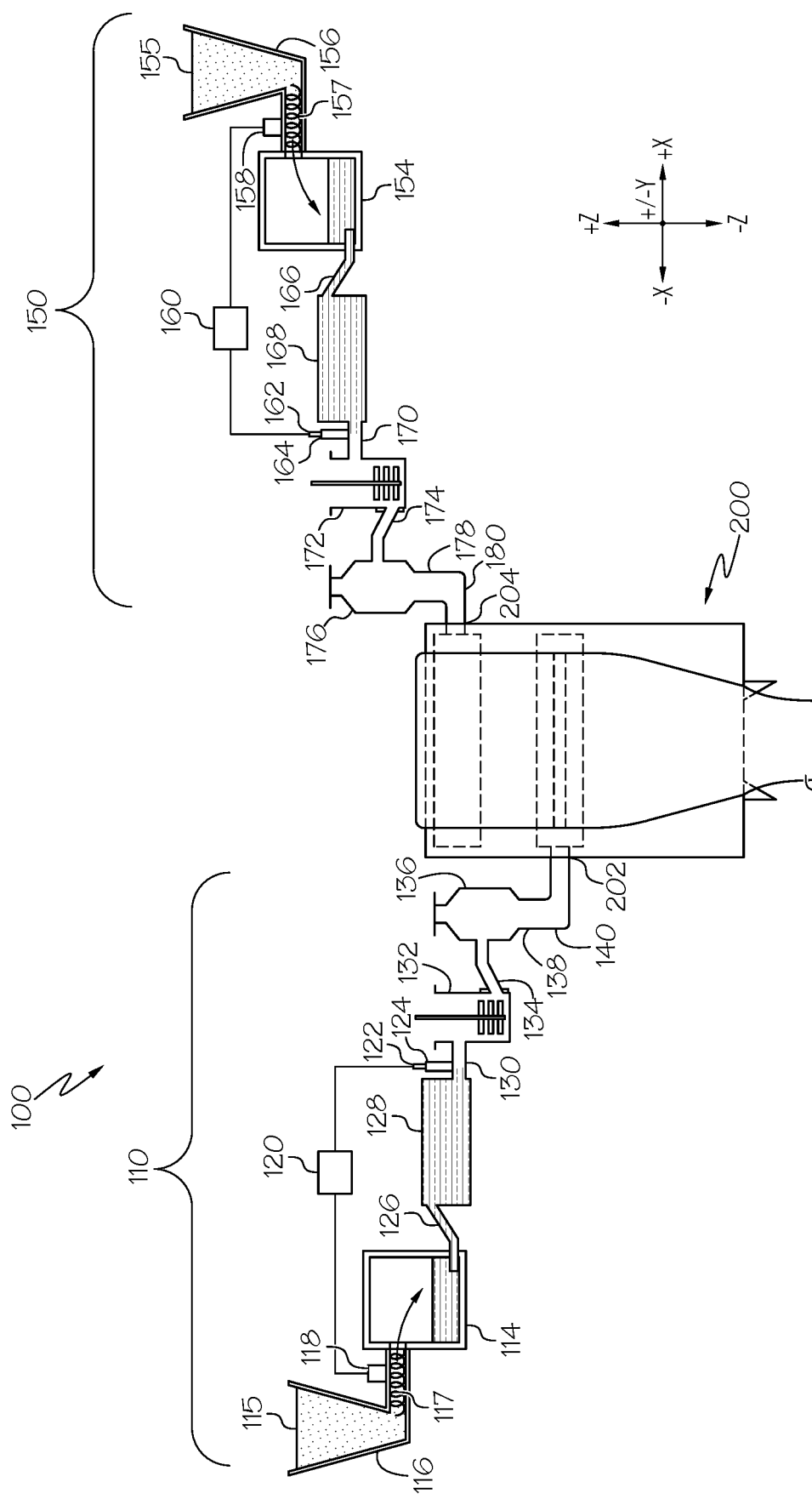
FIG. 1 schematically depicts a laminate glass forming apparatus, according to one or more embodiments shown and described herein.

Referring now to FIG. 1, a glass forming apparatus 100 for making laminate glass articles, such as continuous laminate glass ribbons 102, through a fusion draw process is schematically depicted. The glass forming apparatus 100 may generally include a first molten glass delivery system 110, a second molten glass delivery system 150, and a forming body 200. The first molten glass system 110 may be in fluid communication with a first inlet 202 of the forming body 200 and may be operable to deliver a first molten glass to the first inlet 202 of the forming body 200. The second molten glass system 150 may be in fluid communication with a second inlet 204 of the forming body 200 and may be operable to deliver a second molten glass to the second inlet 204 of the forming body 200.

The first molten glass system 110 may include a first melting vessel 114 that receives a first batch material 115 from a first storage bin 116. The first batch material 115 can be introduced to the first melting vessel 114 by a first batch delivery device 117 powered by a motor 118. An optional first controller 120 may be provided to activate the motor 118 and a first molten glass level probe 122 can be used to measure the glass melt level within a first standpipe 124 and communicate the measured information to the first controller 120. The first molten glass system 110 can also include a first fining vessel 128, such as a fining tube, coupled to the first melting vessel 114 by way of a first connecting tube 126. A first mixing vessel 132 may be coupled to the first fining vessel 128 with a second connecting tube 130. A first delivery vessel 136 may be coupled to the first mixing vessel 132 with a first delivery conduit 134. As further illustrated, a first downcomer 138 may be coupled to the first delivery vessel 136 and may be operable to deliver glass melt from the first delivery vessel 136 to a first delivery tube 140 in fluid communication with the first inlet 202 of the forming body 200.

The second molten glass system 150 may include a second melting vessel 154 that receives a second batch material 155 from a second storage bin 156. The second batch material 155 can be introduced to the second melting vessel 154 by a second batch delivery device 157 powered by a motor 158. An optional second controller 160 may be provided to activate the motor 158, and a second molten glass level probe 162 can be used to measure the glass melt level within a second standpipe 164 and communicate the measured information to the second controller 160. The second molten glass system 150 can also include a second fining vessel 168, such as a fining tube, coupled to the second melting vessel 154 by way of a third connecting tube 166. A second mixing vessel 172 may be coupled to the second fining vessel 168 with a fourth connecting tube 170. A second delivery vessel 176 may be coupled to the second mixing vessel 172 with a second delivery conduit 174. As further illustrated in FIG. 1, a second downcomer 178 may be coupled to the second delivery vessel 176 and may be operable to deliver glass melt from the second delivery vessel 176 to second delivery tube 180 in fluid communication with the second inlet 204 of the forming body 200.

The first melting vessel 114, the second melting vessel 154, or both, are typically made from a refractory material, such as refractory (e.g., ceramic) brick. The glass forming apparatus 100 may further include components that can be made from electrically conductive refractory metals such as, for example, platinum or platinum-containing metals such as platinum-rhodium, platinum-iridium and combinations thereof. Such refractory metals may also include molybdenum, palladium, rhenium, tantalum, titanium, tungsten, ruthenium, osmium, zirconium, and alloys thereof and/or zirconium dioxide. The platinum-containing components can include, but are not limited to, one or more than one of the first connecting tube 126, the first fining vessel 128, the second connecting tube 130, the first standpipe 124, the first mixing vessel 132, the first delivery conduit 134, the first delivery vessel 136, the first downcomer 138, the first delivery tube 140, the third connecting tube 166, the second fining vessel 168, the fourth connecting tube 170, the second standpipe 164, the second mixing vessel 172, the second delivery conduit 174, the second delivery vessel 176, the second downcomer 178, the second delivery tube 180, or combinations of these.

Referring to FIG. 1, in operation, the first batch material 115, specifically batch material for forming glass, is fed from the first storage bin 116 into the first melting vessel 114 with the first batch delivery device 117. The first batch material 115 is melted into a first molten glass in the first melting vessel 114. The first molten glass passes from the first melting vessel 114 into the first fining vessel 128 through the first connecting tube 126. Dissolved gasses, which may result in glass defects, are removed from the first molten glass in the first fining vessel 128. The first molten glass then passes from the first fining vessel 128 into the first mixing vessel 132 through the second connecting tube 130. The first mixing vessel 132 homogenizes the first molten glass, such as by stirring, and the homogenized first molten glass passes through the first delivery conduit 134 to the first delivery vessel 136. The first delivery vessel 136 discharges the homogenized first molten glass through first downcomer 138 and into the first delivery tube 140 in fluid communication with the first inlet 202 of the forming body 200.

Similarly, the second batch material 155, also specifically batch material for forming glass, is fed from the second storage bin 156 into the second melting vessel 154 with the second batch delivery device 157. The second batch material 155 is melted into a second molten glass in the second melting vessel 154. The second molten glass passes from the second melting vessel 154 into the second fining vessel 168 through the third connecting tube 166. Dissolved gasses, which may result in glass defects, are removed from the second molten glass in the second fining vessel 168. The second molten glass then passes from the second fining vessel 168 into the second mixing vessel 172 through the fourth connecting tube 170. The second mixing vessel 172 homogenizes the second molten glass, such as by stirring, and the homogenized second molten glass passes through the second delivery conduit 174 to the second delivery vessel 176. The second delivery vessel 176 discharges the homogenized second molten glass through second downcomer 178 and into the second delivery tube 180 in fluid communication with the second inlet 204 of the forming body 200. Operation of the forming body 200 will be described in further detail later in this Description.

Figure 2:
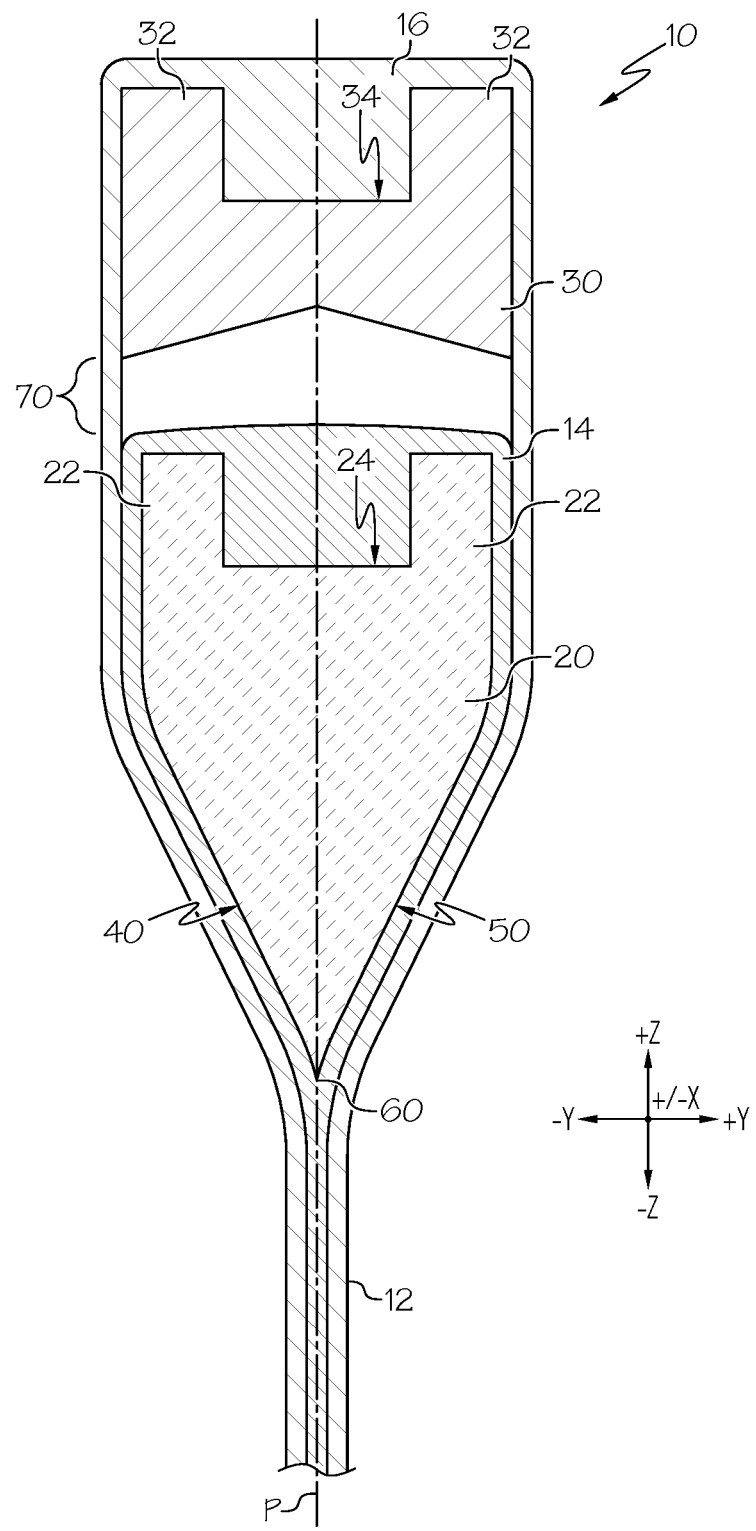
FIG. 2 schematically depicts a forming body provided as a reference for comparison to other forming body designs disclosed herein.

Referring now to FIG. 2, a forming body 10 comprising a double overflow isopipe for producing a laminate fusion glass ribbon 12 is schematically depicted for comparison to other embodiments disclosed herein. The forming body 10 generally includes a first overflow isopipe 20, a second overflow isopipe 30 positioned above and vertically aligned with the first overflow isopipe 20, a first forming surface 40, and a second forming surface 50. The first overflow isopipe 20 may be similar in shape and function to a single isopipe for making a single-layer fusion-draw glass ribbon. The first overflow isopipe 20 includes a pair of first weirs 22 that define a first trough 24 there between. The first forming surface 40 and the second forming surface 50 extend from the first overflow isopipe in a vertically downward direction (i.e., the −Z direction of the coordinate axes depicted in FIG. 2) and converge towards one another, joining at a lower (bottom) edge of the double overflow isopipe 10, which may also be referred to as the root 60. In operation, a molten core glass 14 may be passed into the first trough 24 of the first overflow isopipe 20. The molten core glass 14 may overflow the first weirs 22 and flow down (i.e., in the −Z direction of the coordinate axis of FIG. 2) the first forming surface 40 and the second forming surface 50 in two separate flows of the molten core glass 14. The two separate flows of molten core glass 14 may converge at the root 60 and fuse together to form a core layer of the laminate fusion glass ribbon 12.

The second overflow isopipe 30 is spaced apart from the first overflow isopipe 20 and includes a pair of second weirs 32 that define a second trough 34. The second overflow isopipe 30 differs from the first overflow isopipe 20 in that the second overflow isopipe 30 does not include converging forming surfaces that converge at a root. Instead, the separate molten glass flows from the second overflow isopipe 30 free fall downward (i.e., in the −Z direction of the coordinate axis of FIG. 2) from the outer surface of the second overflow isopipe 30 into contact with the molten core glass 14. In operation, a molten clad glass 16 may be passed into the second trough 34 of the second overflow isopipe 30. The molten clad glass 16 may overflow the second weirs 32 and flow vertically downward (i.e., in the −Z direction) along the outer surfaces of the second overflow isopipe 30 in two separate flows of molten glass. At the gap 70 between the first overflow isopipe 20 and the second overflow isopipe 30, the two separate molten glass flows of the molten clad glass 16 freefall downward (i.e., −Z direction) across the gap and onto the two separate molten glass flows of the molten core glass 14. Each of the flows of molten clad glass 16 fuse with a flow of the molten core glass 14 and continue down the first forming surface 40 and second forming surface 50, respectively, to the root 60. The molten clad glass 16 forms the clad layer of the laminate fusion glass ribbon 12 at the root 60. The laminate fusion glass ribbon 12 may be drawn from the root 60 on the draw plane P in a vertically downward direction (i.e., in the −Z direction of the coordinate axis of FIG. 2) by pulling rolls (not shown). The laminate fusion glass ribbon 12 may be further processed downstream of the forming body 10, such as by segmenting the glass laminate fusion glass ribbon 12 into discrete glass sheets, rolling the laminate fusion glass ribbon 12 upon itself, and/or applying one or more coatings to the glass ribbon 12.

The forming body 10 may enable formation of the laminate fusion glass ribbon 12 having a plurality of glass layers. However, such a forming body 10, as shown in FIG. 2, comprising the double overflow isopipes as shown may require a very precise positioning system for the first overflow isopipe 20 and the second overflow isopipe 30 relative to each other to provide uniform thickness of all three layers of the laminate fusion glass ribbon 12. Additionally, instability of the free falling molten clad glass 16 across the gap 70 between the second overflow isopipe 30 and the first overflow isopipe 20 may lead to variations in the thickness of one or more of the glass layers and/or the overall thickness of the laminate fusion glass ribbon 12 and the laminate glass sheets produced therefrom in some such designs.

Further, the first overflow isopipe 20 for the core glass and the second overflow isopipe 30 for the clad glass may both be designed to deliver uniform molten glass flow only when an isopipe K constant is equal to a predefined value. The isopipe K constant for an isopipe for a fusion draw process may be based on and/or proportional to the multiplication product of the molten glass flow rate and the viscosity of the molten glass. Because the overflow isopipes of the forming body 10 may be designed based on the K constant of the first overflow isopipe 20 and the second overflow isopipe 30, the molten glass flow rate and viscosity of the molten glass in the isopipe troughs may not be changed independently in some such designs. This could limit the available process window of the fusion process for producing laminate glass ribbons using a forming body 10 for example. In particular, an inability to vary the molten glass flow rate and viscosity of the molten glass independent of each other may limit the ability of the forming body 10 to produce different thicknesses of each layer of glass and may limit the range of different glass combinations that may be used for the laminate glass ribbons by limiting the viscosity range of the molten glass compositions for example.

By contrast, other forming bodies disclosed herein overcome such deficiencies in forming body 10 to provide greater consistency in the thicknesses of individual glass layers and overall thickness of the continuous laminate glass ribbon 102. The other forming bodies disclosed herein may also provide for a wider range of glass compositions to be incorporated into the continuous laminate glass ribbon 102. Referring to FIGS. 3-6, the forming bodies 200 disclosed herein may include a first conduit 210 and a second conduit 230 positioned above and vertically aligned with (i.e., aligned in the +/−Z direction of the coordinate axis of FIGS. 2-6) the first conduit 210. The first conduit 210 may include the first inlet 202 in fluid communication with the first molten glass system 110 (FIG. 1), and the second conduit 230 may have a second inlet 204 in fluid communication with the second molten glass system 150 (FIG. 1). Referring to FIGS. 3-5, the first conduit 210 may include a first conduit wall 212 having an interior surface 213 defining a first region 216. The first conduit 210 may include at least one slot (e.g., first slot 220 and/or second slot 222) extending through the first conduit wall 212.

The second conduit 230 may include a second conduit wall 232 having an interior surface 233 defining a second region 336. The second conduit 230 may include at least one slot 240 extending through the second conduit wall 232. The forming bodies 200 disclosed herein may also include a first vertical wall 250 extending vertically (i.e., shown in the +/−Z direction of the coordinate axis in FIGS. 3-5) between an outer surface 214 of the first conduit 210 and an outer surface 234 of the second conduit 230 at the first side 206 of the forming body 200. The forming bodies 200 may include a second vertical wall 260 extending vertically (i.e., in the +/−Z direction of the coordinate axis in FIGS. 3-5) between the outer surface 214 of the first conduit 210 and the outer surface 234 of the second conduit 230 at the second side 208 of the forming body 200. The forming bodies 200 may also include a first forming surface 270 and a second forming surface 272, each of which extend from the first conduit 210 in a vertically downward direction (i.e., the −Z direction of the coordinate axis in FIGS. 3-5) and converge towards one another, joining at the root 274 of the forming body 200.

The first vertical wall 250 and second vertical wall 260 may each provide a continuous surface extending between the second conduit 230 and the first conduit 210, which may provide a smooth and stable confluence of the second molten glass 231 with the first molten glass 211 without free fall of second molten glass 231 into contact with the first molten glass. By eliminating free fall of the second molten glass 231 between the second conduit 230 and contact with the first molten glass 211, the forming bodies 200 of the present disclosure may reduce or prevent flow instabilities and air entrapment at the confluence between the second molten glass 231 and the first molten glass 211, particularly at low glass flow density and viscosity. Reduced flow instability at the confluence of the second molten glass 231 with the first molten glass 211 may improve the consistency in the thickness of the continuous laminate glass ribbon 102 and/or the thickness of any of the plurality of glass layers of the continuous laminate glass ribbon 102. Further, the forming bodies 200 of the present disclosure may not require complicated and expensive independent positioning systems for positioning each of two separate isopipes relative to one another.

The first conduit 210 having at least one slot (e.g., first slot 220 and/or second slot 222) and the second conduit 230 having at least one slot 240 may reduce or eliminate the interdependence of glass viscosity and glass flow rate, which may enable independent control of glass flow profiles and glass viscosities. Independent control of glass flow and glass viscosity may broaden the available combinations of glass compositions that can be incorporated into the continuous laminate glass ribbon 102. Additionally, independent control of glass flow profile and glass viscosity can broaden the range of possible thickness ratios between the individual glass layers of the continuous laminate glass ribbon 102. Independent control of glass flow profiles may also enable delivering a target thickness ratio profile across the draw and reduce or prevent inconsistencies, such as problematic clad beads in case of core/clad lamination.

In addition to these features, the forming bodies 200 disclosed herein may allow for straightforward extension to an arbitrary number of layers glass layers by adding one or a plurality of supplemental conduits to the forming body 200. The forming bodies 200 may also enable flexibility in independently varying the width of each of the glass layers, such as making one glass layer narrower than another glass layer or keeping all of the glass layers the same width. The number of slots and location of the slots in each of the conduits may be varied to modify the number of glass layers in the continuous laminate glass ribbon 102. With the use of batch platinum melters and glass cullet, the glass forming apparatus 100 may enable quick change of glass compositions for one or more layers of the continuous laminate glass ribbon in order to change the properties or thickness of one or more of the glass layers. Additionally, the glass forming apparatus 100 and forming bodies 200 may enable short start-up times and quick transition between glass compositions, among other features.

Referring to FIGS. 4 and 5, as previously discussed, the forming bodies 200 disclosed herein may include the first conduit 210 comprising a first conduit wall 212. The first conduit wall 212 may have an interior surface 213 defining a first region 216 and at least one slot (e.g., first slot 220, second slot 222, or both) extending through the first conduit wall 212. The first region 216 may be fully enclosed by the first conduit wall 212 such that the first conduit 210 does not have an open side. The first conduit wall 212 may also have an outer surface 214 facing outward from the first region 216. Referring to FIG. 5, the first conduit 210 may have a first conduit inlet end 217 proximate to and in fluid communication with a first inlet 202 (FIG. 3) of the forming body 200. The first conduit 210 may also have a first conduit compression end 218, which may be an end of the first conduit 210 opposite the first conduit inlet end 217. The first conduit wall 212 may extend along a longitudinal length $L_1$ of the first conduit 212 from the first conduit inlet end 217 to the first conduit compression end 218. The first region 216 may be in fluid communication with the first inlet 202 (FIG. 3) of the forming body 200 by way of the first conduit inlet end 217. A first molten glass 211 from the first molten glass system 110 (FIG. 1) may flow into the first conduit 210 through the first conduit inlet end 217 and may flow through the first region 216 of the first conduit 210 in a direction from the first conduit inlet end 217 towards the first conduit compression end 218.

The first conduit wall 212 may be generally cylindrical in shape. The interior surface 213 of the first conduit wall 212 may have a cross-sectional shape conducive to flowing a molten glass through the entire length $L_1$ of the first conduit 210. In some embodiments, the interior surface 213 of the first conduit wall 212 may have a cross-sectional shape that is circular in shape. Other cross-sectional shapes are contemplated, such as but not limited to ovoid, polygonal, or other shapes. Referring to FIG. 5, in some embodiments, the cross-sectional area of the first region 216 defined by the interior surface 213 of the first conduit wall 212 may decrease along the length $L_1$ of the first conduit 210 from the first conduit inlet end 217 to the first conduit compression end 218. In some embodiments, the cross-sectional area of the first conduit wall 212 may stay the same along the length $L_1$ of the first conduit 210. Referring now to FIG. 4, in some embodiments, the first conduit 210 may have a centerline 215 that may be vertically aligned with the draw plane P of the forming body 200.

Referring to FIG. 4, the first conduit 210 includes at least one slot (e.g., first slot 220, second slot 222, or both) extending through the first conduit wall 212. In some embodiments, the first conduit 210 may include at least a first slot 220 and a second slot 222. The first slot 220 may be positioned at the first side 206 of the forming body 200, and the second slot 222 may be positioned at the second side 208 of the forming body 200, the second side 208 being a side opposite the first side 206. The slot in the first conduit wall 212 may be in fluid communication with the first region 216. In some embodiments, the first slot 220, the second slot 222, or both, may be in fluid communication with the first region 216. Fluid communication between the first region 216 and the first slot 220 and second slot 222 may enable the first molten glass 211 to flow from the first region 216 through the first slot 220 and the second slot 222 to the outer surface 214 of the first conduit wall 212.

Figure 6A:
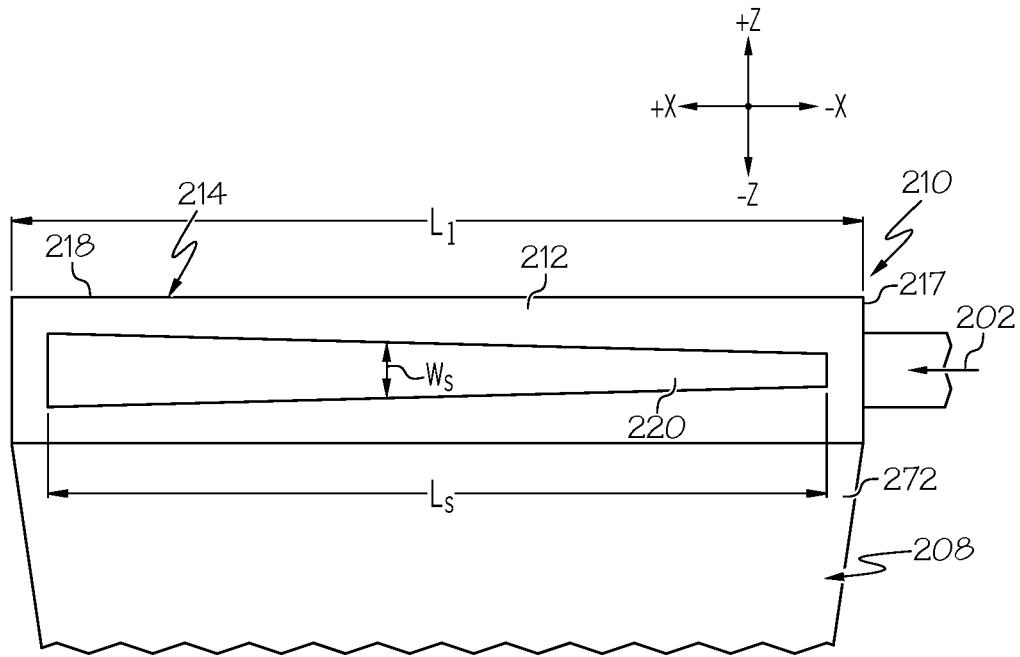
FIG. 6A schematically depicts a side view of a first conduit of the forming body of FIG. 3, according to one or more embodiments shown and described herein.

Referring to FIG. 6A, the first slot 220 and the second slot 222 may each be characterized by a slot length $L_S$ and a slot width $W_S$, which is less than the slot length $L_S$. The dimensions and proportions in FIG. 6A may be exaggerated for purposes of illustration. Although FIG. 6A illustrates only the first slot 220, it is understood that the second slot 22 may have any of the features, dimensions, or characteristics described herein in relation to the first slot 220. The first slot 220, the second slot 222, or both, may have a longest dimension (e.g., the slot length $L_S$) aligned with a direction of flow of the first molten glass 211 through the first conduit 210 from the first conduit inlet end 217 to the first conduit compression end 218. In some embodiments, the slot length $L_S$ of the first slot 220, the second slot 222, or both, may be parallel to the draw plane P (FIG. 4) of the forming body 200. The second slot 222 may be the same or different from the first slot 220.

Figure 7:
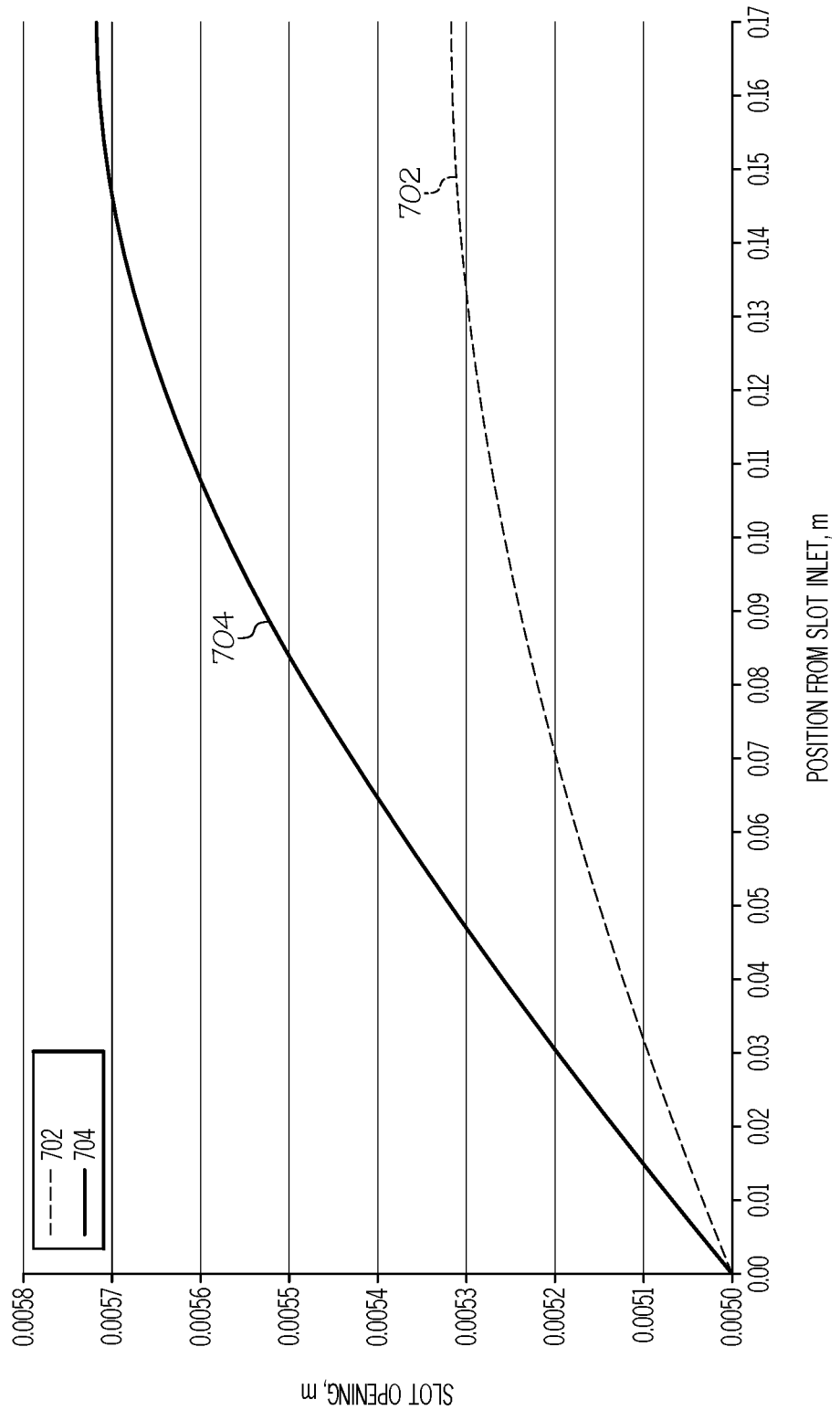
FIG. 7 graphically depicts a plot of a width of the slot opening (y-axis) as a function of position from an inlet end of the slot (x-axis) for a first conduit and a second conduit of the forming body of FIG. 3, according to one or more embodiments shown and described herein.

The first slot 220 and the second slot 222 may have a geometry that provides a target glass flow distribution along the slot length $L_S$ of the first slot 220 and the second slot 222. To provide a consistent molten glass flow along the slot length $L_S$ of each slot, the geometry of the slot may provide a decrease in the impedance to flow of molten glass along the slot length $L_S$ from the first conduit inlet end 217 towards the first conduit compression end 218. The decreasing impedance of the first slot 220 and second slot 222 along the slot length $L_S$ may compensate for the viscous friction of the molten glass flow through the first conduit 210. The slot geometry of the first slot 220 and the second slot 222 may depend on the dimensions of the first conduit 210 and the target slot length $L_S$ of the first slot 220 and/or the second slot 222. The impedance may be tuned by changing slot width $W_S$ of the slot, the thickness of the first conduit wall 212, or the inner dimensions (e.g., inner radius) of the interior surface 213 of the first conduit wall 212. In some embodiments, the slot width $W_S$ of the first slot 220, the second slot 222, or both may increase along the slot length $L_S$ from the first conduit inlet end 217 to the first conduit compression end 218. Referring to FIG. 7, the slot width $W_S$ (y-axis) of the first slot 220 or the second slot 222 is graphically depicted as a function of distance from the inlet end 217 of the first conduit 210, and is indicated with reference number 702. As shown in FIG. 7, the slot width $W_S$ may increase as the distance from the first conduit inlet end 217 increases.

As shown in FIG. 6A, in some embodiments, the first slot 220, the second slot 222, or both may be a single continuous slot along the slot length $L_S$. In other embodiments, the first slot 220, the second slot 222, or both, may each include a perforated slot. The perforated slot may include a plurality of smaller slots aligned along a direction of flow of the first molten glass 211 through the first conduit 210. In some embodiments, each of the smaller slots of the perforated slot may have a widened portion at either end of the smaller slot to provide additional glass flow to compensate for the discontinuous regions between the smaller slots. In some embodiments, the perforated slots may exhibit improved creep resistance compared to continuous slots, which may enable better control when producing wider continuous laminate glass ribbons 102. In some embodiments, the at least one slot in the first conduit wall 212 may include a plurality of slots, wherein the plurality of slots are aligned along a linear path parallel to the flow direction of the first conduit 210. Additional features, geometries, and characteristics of the first conduit 210, first conduit wall 212, and the slots (e.g., first slot 220 and second slot 222) in the first conduit wall 212 are described in U.S. Provisional Patent Application No. 62/717,173, filed on Aug. 10, 2018, the entire contents of which are incorporated by reference in this disclosure.

Referring again to FIGS. 3-5, as previously discussed, the forming bodies 200 disclosed herein may include a second conduit 230. The second conduit 230 may be disposed vertically above (i.e., in the +Z direction of the coordinate axis in FIGS. 3-5) and may be vertically aligned with (i.e., aligned in the +/−Z direction of the coordinate axis in FIGS. 3-5) the first conduit 210. In some embodiments, a centerline 235 of the second conduit 230 may be vertically aligned with the centerline 215 of the first conduit 210. The second conduit 230 may include a second conduit wall 232. The second conduit wall 232 may have an interior surface 233 defining a second region 236 and at least one slot 240 extending through the second conduit wall 232. The second region 236 may be fully enclosed by the second conduit wall 232 such that the second conduit 230 does not have an open side. The second conduit wall 232 may also have an outer surface 234 facing outward from the second region 236. Referring to FIG. 5, the second conduit 230 may have a second conduit inlet end 237 proximate to and in fluid communication with a second inlet 204 (FIG. 3) of the forming body 200. The second conduit 230 may also have a second conduit compression end 238, which may be an end of the second conduit 230 opposite the second conduit inlet end 237.

The second conduit wall 232 may extend along a longitudinal length $L_2$ of the second conduit 232 from the second conduit inlet end 237 to the second conduit compression end 238. The second region 236 may be in fluid communication with the second inlet 204 (FIG. 3) of the forming body 200 by way of the second conduit inlet end 237. A second molten glass 231 from the second molten glass system 150 (FIG. 1) may flow into the second conduit 230 through the second conduit inlet end 237 and may flow through the second region 236 of the second conduit 230 in a direction from the second conduit inlet end 237 towards the second conduit compression end 238. Referring to FIG. 5, in some embodiments, the second conduit 230 may be oriented so that a direction of flow of the second molten glass 231 through the second conduit 230 is opposite the direction of flow of the first molten glass 211 through the first conduit 210. Alternatively, in other embodiments, the first conduit 210 and the second conduit 230 may be oriented so that the direction of flow in the second conduit 230 is the same as the direction of flow in the first conduit 210.

Referring to FIGS. 4 and 5, the second conduit wall 232 may be generally cylindrical in shape. The interior surface 233 of the second conduit wall 232 may have a cross-sectional shape conducive to flowing a molten glass through the entire length $L_2$ of the second conduit 230. In some embodiments, the interior surface 233 of the second conduit wall 232 may have a cross-sectional shape that is circular. Other cross-sectional shapes are contemplated, such as but not limited to ovoid, polygonal, or other shape. Referring to FIG. 5, in some embodiments, the cross-sectional area of the second region 236 defined by the interior surface 233 of the second conduit wall 232 may decrease along the length $L_2$ of the second conduit 230 from the second conduit inlet end 237 to the second conduit compression end 238. In some embodiments, the cross-sectional area of the second conduit wall 232 may stay the same along the length $L_2$ of the second conduit 230. The shape of an outer surface 234 of the second conduit wall 232 may be the same or different than the shape of the outer surface 214 of the first conduit wall 212. For example, an outer diameter of the second conduit wall 232 may be the same or different than an outer diameter of the first conduit wall 212. Referring now to FIG. 4, in some embodiments, the second conduit 230 may have a centerline 235 that may be vertically aligned with the draw plane P of the forming body 200, with the centerline 215 of the first conduit 210, or both.

Figure 8:
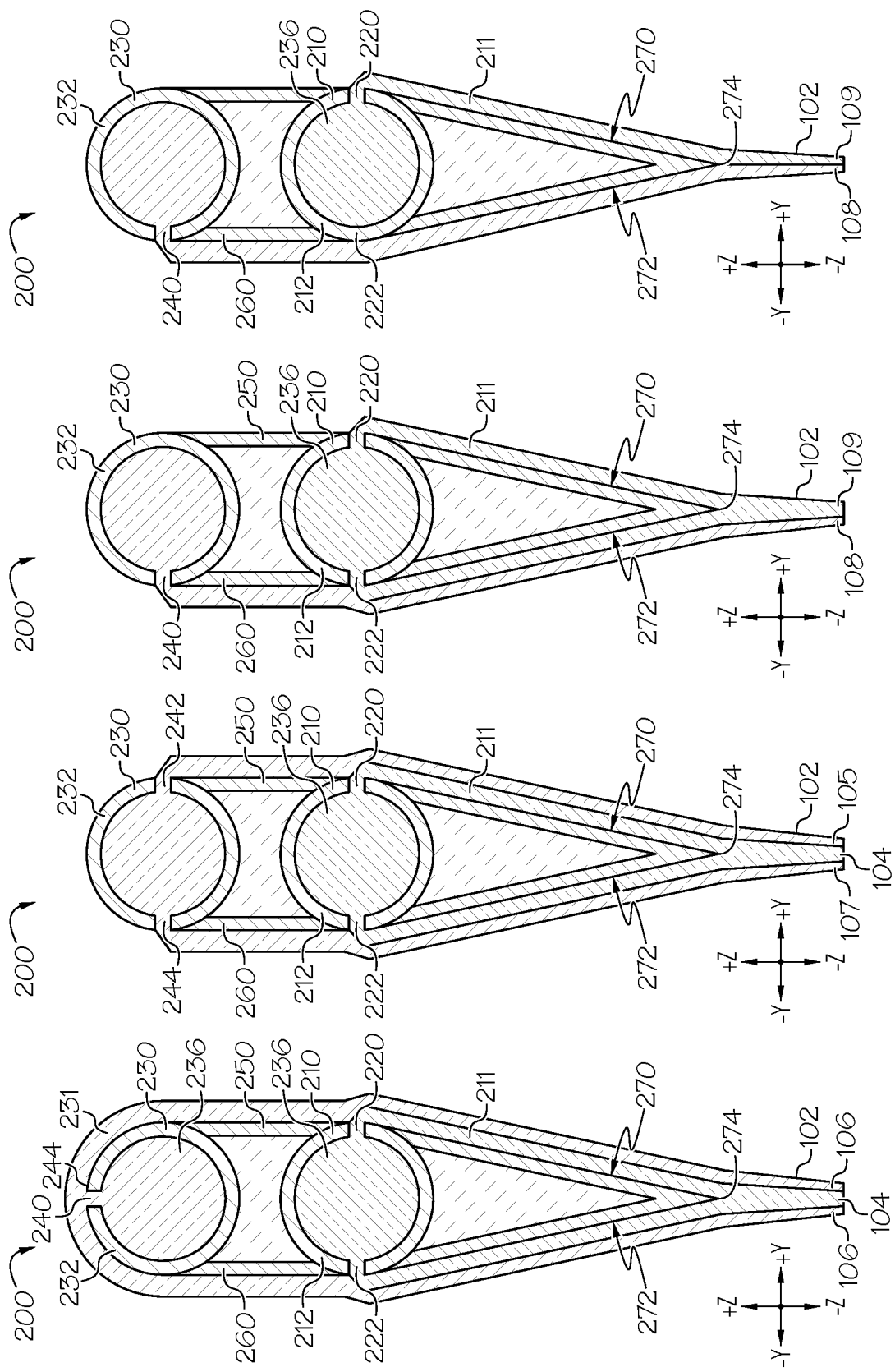
FIG. 8A schematically depicts a cross-sectional view of the forming body of FIG. 3, according to one or more embodiments shown and described herein.
FIG. 8B schematically depicts a cross-sectional view of another forming body for the laminate glass forming apparatus of FIG. 1, according to one or more embodiments shown and described herein.
FIG. 8C schematically depicts a cross-sectional view of another forming body for the laminate glass forming apparatus of FIG. 1, according to one or more embodiments shown and described herein.
FIG. 8D schematically depicts a cross-sectional view of yet another forming body for the laminate glass forming apparatus of FIG. 1, according to one or more embodiments shown and described herein.

Referring to FIG. 4, the second conduit 230 may include at least one slot 240 extending through the second conduit wall 232. In some embodiments, the slot 240 may be position in a topmost portion of the second conduit wall 232. The slot 240 in the second conduit wall 232 may be in fluid communication with the second region 236. Fluid communication between the second region 236 and the slot 240 may enable the second molten glass 231 to flow from the second region 236 through the slot 240 to the outer surface 234 of the second conduit wall 232. Referring to FIG. 8B, in some embodiments, the second conduit 230 may include at least a first slot 241 and a second slot 242. The first slot 241 of the second conduit 230 may be positioned at the first side 206 of the forming body 200, and the second slot 242 of the second conduit 230 may be positioned at the second side 208 of the forming body 200, the second side 208 being opposite the first side 206. The first slot 241, the second slot 242, or both, may be in fluid communication with the second region 236 to enable the second molten glass 231 to flow from the second region 236 through the first slot 241, the second slot 242, or both to the outer surface 234 of the second conduit wall 232.

Figure 6B:
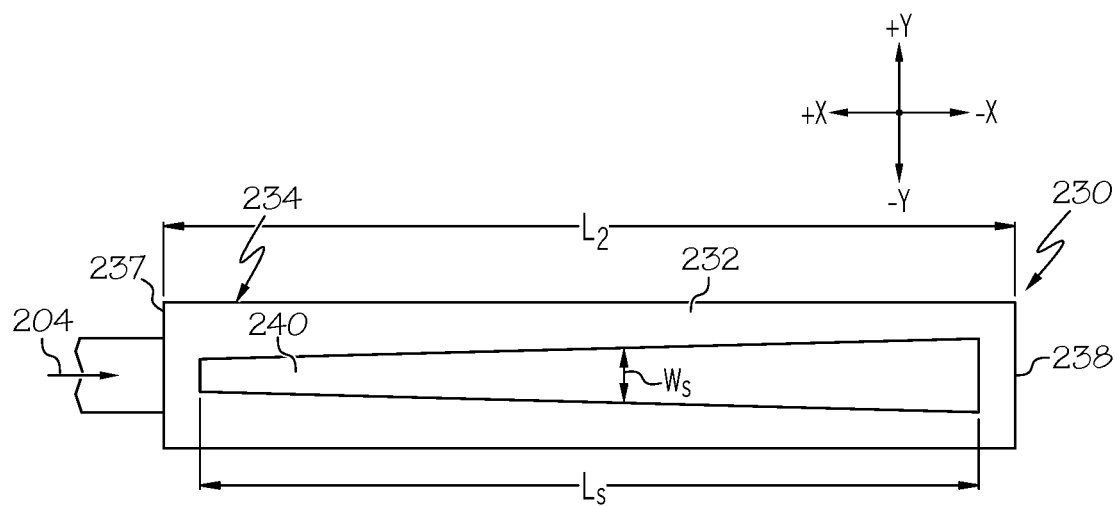
FIG. 6B schematically depicts a top view of a second conduit of the forming body of FIG. 3, according to one or more embodiments shown and described herein.

The slot 240, the first slot 241, and/or the second slot 242 in the second conduit wall 232 may have any of the features, geometries, or characteristics previously described in reference to the first slot 220 and the second slot 222 of the first conduit 210. Referring now to FIG. 6B, the slot 240 in the second conduit wall 232 may be characterized by a slot length $L_S$ and a slot width $W_S$, which is less than the slot length $L_S$. The dimensions and proportions in FIG. 6B may be exaggerated for purposes of illustration. The slot 240 in the second conduit wall 232 may have a longest dimension (e.g., the slot length $L_S$) aligned with a direction of flow of the second molten glass 231 through the second conduit 230. In some embodiments, the slot length $L_S$ of the slot 240 may be parallel to the draw plane P (FIG. 4) of the forming body 200.

The slot 240 may have a geometry that provides a target glass flow distribution along the slot length $L_S$. To provide a consistent molten glass flow along the slot length $L_S$, the geometry of the slot may result in a decrease in the impedance to flow of molten glass along the slot length $L_S$ from the second conduit inlet end 237 towards the second conduit compression end 238. The decreasing impedance of the slot 240 along the slot length $L_S$ may compensate for the viscous friction of the molten glass flow through the second conduit 230. The slot geometry of the slot 240 may depend on the dimensions of the second conduit 230 and the target slot length $L_S$. The impedance may be tuned by changing slot width $W_S$ of the slot 240, the thickness of the second conduit wall 232, or the inner dimensions (e.g., inner radius) of the interior surface 233 of the second conduit wall 232. In some embodiments, the slot width $W_S$ of the slot 240 may increase along the slot length $L_S$. Referring to FIG. 7, the slot width $W_S$ (y-axis) of the slot 240 in the second conduit wall 232 is graphically depicted as a function of distance from the inlet end 237 of the second conduit 230, and is indicated with reference number 704. As shown in FIG. 7, the slot width $W_S$ increases as the distance from the second conduit inlet end 237 increases. Series 704 is representative of a single slot 240 in the top portion of the second conduit wall 232. The single slot 240 may have a larger slot width $W_S$ compared to each of the first slot 220 and second slot 222 of the first conduit 210 (reference 702) due to the increased molten glass flow rate needed to produce two flows of the second molten glass 231, one down each side of the forming body 200.

As shown in FIG. 6B, in some embodiments, the slot 240 may be a single continuous slot along the slot length $L_S$. In other embodiments, the slot 240 may be a perforated slot comprising a plurality of smaller slots aligned along a direction of flow of the second molten glass 231 through the second conduit 230. In some embodiments, each of the smaller slots of the perforated slot may have a widened portion at either end of the smaller slot to provide additional glass flow to compensate for the discontinuous regions between the smaller slots. In some embodiments, the perforated slots may exhibit improved creep resistance compared to continuous slots, which may enable better control when producing wider continuous laminate glass ribbons 102. In some embodiments, the at least one slot 240 in the second conduit wall 232 may include a plurality of slots, wherein the plurality of slots are aligned along a linear path parallel to the flow direction of the second conduit 230. Additional features, geometries, and characteristics of the second conduit 230, second conduit wall 232, and the slot 240 in the second conduit wall 232 are described in U.S. Provisional Patent Application No. 62/717,173, filed on Aug. 10, 2018, the entire contents of which are incorporated by reference in this disclosure. when the second conduit 230 includes the first slot 241 and the second slot 242, the first slot 241 and/or the second slot may have any of the features, dimensions, or characteristics described herein for the flow 240.

The first conduit wall 212, the second conduit wall 232, or both, may be constructed of a refractory metal capable of withstanding the temperatures experienced during formation of the continuous laminate glass ribbon 102 without degrading or reacting with the constituents of the first molten glass 211 or the second molten glass 231. The refractory metal may be platinum, platinum alloy, or other metals or metal alloys. In some embodiments, the first conduit wall 212, the second conduit wall 232, or both, may be platinum or a platinum-alloy. All-platinum or platinum alloy surfaces of the first conduit wall 212, second conduit tool 232, and other components of the forming body 200 may reduce or prevent compatibility issues between the glass compositions and refractory materials used for overflow-style isopipes.

Referring again to FIG. 4, the forming bodies 200 may include a conduit support 252 disposed between the first conduit 210 and the second conduit 230. The conduit support 252 may have an upper surface 254 and a lower surface 256. The upper surface 254 may be configured to support a lower portion of the second conduit wall 232, which may be disposed vertically above (i.e., in the +Z direction of the coordinate axis of FIG. 4) the conduit support 252. In some embodiments, the upper surface 254 of the conduit support 252 may have a shape conforming to at least a portion of a contour of the outer surface 234 of the second conduit wall 232 in the lower portion of the second conduit 230. In some embodiments, the upper surface 254 of the conduit support 252 may include one or a plurality of support beams (not shown) shaped to support at least a portion of the lower portion of the second conduit 230. The conduit support 252 may support from 25% to 80% of the lower portion of the outer surface 234 of the second conduit wall 232. The conduit support 252 may be operable to reduce or prevent deformation of the second conduit 230 in a vertical direction (e.g., in the +/−Z direction of the coordinate axis in FIG. 4) and/or in a horizontal direction (i.e., in the +/−Y direction of the coordinate axis in FIG. 4) during formation of the continuous laminate glass ribbon 102.

The lower surface 256 of the conduit support 252 may be configured to support an upper portion of the first conduit wall 212, which may be disposed vertically below (i.e., in the −Z direction of the coordinate axis of FIG. 4) the conduit support 252. In some embodiments, the lower surface 256 of the conduit support 252 may have a shape conforming to at least a portion of the contour of the outer surface 214 of the first conduit wall 212 in the upper portion of the first conduit 210. In some embodiments, the lower surface 256 of the conduit support 252 may include one or a plurality of support beams (not shown) shaped to support at least a portion of the upper portion of the first conduit 210. The conduit support 252 may support from 25% to 80% of the upper portion of the outer surface 214 of the first conduit wall 212. The conduit support 252 may be operable to reduce or prevent deformation of the second conduit 230 in a vertical direction (e.g., in the +/−Z direction of the coordinate axis in FIG. 4) and/or in a horizontal direction (i.e., in the +/−Y direction of the coordinate axis in FIG. 4) during formation of the continuous laminate glass ribbon 102. For example, in some embodiments, the conduit support 252 may support the weight of the second conduit 230 and second molten glass 231 to prevent the weight of the second conduit 230 from deforming the upper portion of the first conduit wall 212 vertically downward (i.e., in the −Z direction of the coordinate axis in FIG. 4). The conduit support 252 may also prevent hydrostatic forces from the first molten glass 211 and/or the second molten glass 231 from deforming the first conduit wall 212 and/or the second conduit wall 232 outward.

The conduit support 252 may be formed from a support material capable of withstanding the temperatures experienced during formation of the continuous laminate glass ribbon 102 without deforming or experiencing creep. In some embodiments, the conduit support 252 can be constructed from a support material having a creep rate from $1\times10^{-12}$ per second ($s^{-1}$) to $1\times10^{-14}$ $s^{-1}$ under a pressure of from 1 MPa to 5 MPa and at a temperature of 1400° C. In some embodiments, the conduit support 252 may be constructed of a refractory material, such as, but limited to, one or more refractory metals, ceramic materials, or other refractory materials. In some embodiments, the conduit support 252 may include a ceramic material, such as, but not limited to, zircon (e.g., zirconium silicate), low creep zircon, silicon carbide, xenotime, alumina-based refractory ceramics, or combinations of these. In some embodiments, the conduit support 252 may include a support material that is porous. The conduit support 252 can withstand creep under high stress and temperature to enable maintenance of the position and shape of the first conduit wall 212 and the second conduit wall 232 during formation of the continuous laminate glass ribbon 102.

In some embodiments, the refractory material of the conduit support 252 may be incompatible for physical contact with the refractory metal of the first conduit wall 212 and second conduit wall 232. For example, in some embodiments, the first conduit wall 212, the second conduit wall 232, or both, may include platinum (e.g. platinum or platinum alloy), and the conduit support 252 may include silicon carbide, which may corrode or otherwise chemically react when contacted with platinum. In some embodiments, the conduit support 252 may include a layer of intermediate material (not shown) disposed between the upper surface 254 of the conduit support 252 and the second outer wall 232 of the second conduit 230, between the lower surface 256 of the conduit support 252 and the first outer wall 212 of the first conduit 210, or both. The intermediate material may be operable to separate the refractory material of the conduit support 252 from the platinum-containing metal or other refractory metal of the first conduit wall 212 and/or the second conduit wall 232.

In some embodiments, the forming bodies 200 may include a conduit support vacuum tube 264 in fluid communication with the support material of the conduit support 252. The vacuum tube 264 may be fluidly coupled to a vacuum system (not shown), such as a vacuum pump or Venturi system. The vacuum system may be operable to create a vacuum within the vacuum tube 264 and within the support material of the conduit support 252.

Referring to FIG. 4, the forming bodies 200 may include the first vertical wall 250 and the second vertical wall 260, both of which may extend generally vertically (i.e., in generally the +/−Z direction of the coordinate axis of FIG. 4) between the outer surface 234 of the second conduit wall 232 and the outer surface 214 of the first conduit wall 212. An outer surface 251 of the first vertical wall 250 and an outer surface 261 of the second vertical wall 260 may provide continuous surfaces over which the flows of the second molten glass 231 from the second conduit 230 can flow from the outer surface 234 of the second conduit wall 232 into contact with the first molten glass 211 from the first conduit 210. Thus, the first vertical wall 250 and the second vertical wall 260 may eliminate any gaps or air pockets between the flow of the second molten glass 231 and the forming body 200 before confluence of the flows of the second molten glass 231 with the flows of the first molten glass 211 flowing out of the first slot 220 and second slot 222.

The first vertical wall 250 may be positioned at the first side 206 of the forming body 200 and may extend generally vertically (i.e., in the +/−Z direction of the coordinate axis of FIG. 4) between the first conduit 210 to the second conduit 230. The first vertical wall 250 may be coupled to the outer surface 234 of the second conduit wall 232 proximate a point at which a vertical plane (i.e., a plane in the X-Z plane of the coordinate axis in FIG. 4) is tangent to the outer surface 234 of the second conduit wall 232 at the first side 206 of the forming body 200. In some embodiments in which the second conduit 230 has two slots, the first vertical wall 250 may be coupled to the outer surface 234 of the second conduit wall 232 proximate a first slot 241 (FIG. 8B) in the second conduit wall 232. The other end of the first vertical wall 250 may be coupled to the outer surface 214 of the first conduit wall 212 proximate the first slot 220 in the first conduit wall 212. In some embodiments, the first vertical wall 250 may be coupled to a side of the conduit support 252 at a first side 206 of the forming body 200. As such, the first vertical wall 250 may be at least partially or fully supported by the conduit support 252. In other embodiments, the first vertical wall 250 may be spaced apart from the conduit support 252 so that the first vertical wall 250 does not contact the conduit support 252.

The second vertical wall 260 may be positioned at a second side 208 of the forming body 200 and may extend generally vertically (i.e., in the +/−Z direction of the coordinate axis of FIG. 4) between the first conduit 210 and the second conduit 230. The second vertical wall 260 may be coupled to the outer surface 234 of the second conduit wall 232 proximate a point at which a vertical plane (i.e., a plane in the X-Z plane of the coordinate axis in FIG. 4) is tangent to the outer surface 234 of the second conduit wall 232 at the second side 208 of the forming body 200. In some embodiments in which the second conduit 230 has two slots, the second vertical wall 260 may be coupled to the outer surface 234 of the second conduit wall 232 proximate the second slot 242 (FIG. 8B) in the second conduit wall 232. The other end of the second vertical wall 260 may be coupled to the outer surface 214 of the first conduit wall 212 proximate the second slot 222 in the first conduit wall 212. In some embodiments, the second vertical wall 260 may be coupled to a side of the conduit support 252 at the second side 208 of the forming body 200. As such, the second vertical wall 260 may be at least partially or fully supported by the conduit support 252. In other embodiments, the second vertical wall 260 may be spaced apart from the conduit support 252 so that the second vertical wall 260 does not contact the conduit support 252.

The first vertical wall 250, the second vertical wall 260, or both, may be configured so that flows of a second molten glass 231 from the second conduit 230 can maintain contact with the forming body 200 until contacting the flows of the first molten glass 211 from the first conduit 210. In some embodiments, the first vertical wall 250, the second vertical wall 260, or both, may be configured so that the flows of the second molten glass 231 from the second conduit 230 do not free fall over a distance between the second conduit 230 and the first conduit 210. When the first conduit 210 and the second conduit 230 are the same shape and size (e.g., have the same outer diameter), the first vertical wall 250 and the second vertical wall 260 may extend vertically (i.e., in the +/−Z direction of the coordinate axis of FIG. 4). When the first conduit 210 and the second conduit 230 are different shapes and/or sizes (e.g., different outside diameters), the first vertical wall 250, the second vertical wall 260, or both, may not be perfectly vertical, but may be sloped between the first conduit 210 and the second conduit 230. For example, in some embodiments, the second conduit 230 may be smaller in diameter than the first conduit 210 such that the first vertical wall 250, the second vertical wall 260, or both, may extend at an angle from first conduit wall 212 to the second conduit wall 232.

The first vertical wall 250, the second vertical wall 260, or both, may be constructed of a refractory metal, such as but not limited to, platinum, platinum-alloy, or other refractory metal or metal alloy. The first vertical wall 250, the second vertical wall 260, or both, may be the same material as the first conduit wall 212 and the second conduit wall 232. In some embodiments, the first conduit wall 212, the second conduit wall 232, the first vertical wall 250, and the second vertical wall 260 may include platinum or a platinum alloy. In some embodiments, the first conduit wall 212, the second conduit wall 232, the first vertical wall 250, and the second vertical wall 260 may consist of or consist essentially of platinum or a platinum alloy.

Referring to FIG. 4, the forming body 200 may include a forming wedge 280 comprising a forming surface support 281, a first outer wall 284 providing the first forming surface 270, and a second outer wall 286 providing the second forming surface 272. The first forming surface 270 and the second forming surface 272 may extend from the outer surface 214 of the first conduit wall 212 and may converge at the root 274 of the forming body 200. The first forming surface 270 and the second forming surface 272 extend from the outer surface 214 of the first conduit wall 212 in a vertically downward direction (i.e., the −Z direction of the coordinate axes in FIG. 4) and converge towards one another, joining at the root 274 of the forming body 200. Accordingly, it should be understood that the first forming surface 270 and the second forming surface 272 may, in some embodiments, form a shape resembling an inverted triangle (isosceles or equilateral) extending from the first conduit 210 of the forming body 200 with the root 274 forming the lower-most vertex of the triangle in the vertically downward direction. The draw plane P generally bisects the root 274 in the +/−Y directions of the coordinate axes depicted in FIG. 4 and extends in the vertically downward direction and in the +/−X directions from the inlet end 217 to the compression end 218 of the first conduit 210 of the forming body 200.

The forming surface support 281 may be disposed below the first conduit 210 and between the first forming surface 270 on the first side 206 of the forming body 200 and the second forming surface 272 on the second side 208 of the forming body 200. The forming surface support 281 may support the first conduit 210, may provide shape to the first forming surface 270 and the second forming surface 272, and may provide support to the root 274. The forming surface support 281 may include a first conduit support surface 282 configured to support a bottom portion of the first conduit wall 212, which may be disposed vertically above (i.e., in the +Z direction of the coordinate axis of FIG. 4) the forming surface support 281. In some embodiments, the first conduit support surface 282 may have a shape conforming to at least a portion of a contour of the outer surface 214 of the first conduit wall 212 in the lower portion of the first conduit 210. In some embodiments, the first conduit support surface 282 may include one or a plurality of support beams (not shown) shaped to support at least a portion of the lower portion of the first conduit 210. The first conduit support surface 282 may support from 25% to 80% of the lower portion of the outer surface 214 of the first conduit wall 212. The first conduit support surface 282 may support the weight of the first conduit 210 and second conduit 230 during operation of the forming body 200. The first conduit support surface 282 may be operable to reduce or prevent deformation of the first conduit 210 in a vertical direction (e.g., in the −Z direction of the coordinate axis in FIG. 4) and/or in a horizontal direction (i.e., in the +/−Y direction of the coordinate axis in FIG. 4) during formation of the continuous laminate glass ribbon 102.

The forming surface support 281 may be constructed of a support material capable of withstanding the temperatures experienced during formation of the continuous laminate glass ribbon 102 without deforming or experiencing creep. The forming surface support 281 may include a support material that is the same or different from the support material of the conduit support 252, previously described herein. In some embodiments, the forming surface support 281 can be constructed from a support material having a creep rate from $1\times10^{-12}$ per second (s−1) to $1\times10^{-14}$ s−1 under a pressure of from 1 MPa to 5 MPa and at a temperature of 1400° C. In some embodiments, the forming surface support 281 may be constructed of a refractory material, such as, but limited to, one or more refractory metals, ceramic materials, or other refractory materials. In some embodiments, the forming surface support 281 may include a ceramic material, such as, but not limited to, zircon (e.g., zirconium silicate), low creep zircon, silicon carbide, xenotime, alumina based refractory ceramics, or combinations of these. In some embodiments, the forming surface support 281 may include a support material that is porous. The forming surface support 281 can withstand creep under high stress and temperature to enable maintenance of the position and shape of the first conduit wall 212 during formation of the continuous laminate glass ribbon 102.

In some embodiments, the refractory material of the forming surface support 281 may be incompatible for physical contact with the refractory metal of the first conduit wall 212, the first outer wall 284 of the forming wedge 280, or the second outer wall 286 of the forming wedge 280. For example, in some embodiments, the first conduit wall 212, the first outer wall 284, and/or the second outer wall 286 may include platinum (e.g. platinum or platinum alloy), and the forming surface support 281 may include silicon carbide, which may corrode or otherwise chemically react when contacted with platinum. In some embodiments, the forming surface support 281 may include a layer of an intermediate material (not shown) disposed between the first conduit support surface 282 and the first conduit 210. The intermediate material may also be disposed between the forming surface support 281 and the first outer wall 284 and second outer wall 286. The intermediate material may be operable to separate the refractory material of the forming surface support 281 from the platinum containing metal or other refractory metal of the first conduit wall 212, first outer wall 284, and/or the second outer wall 286.

In some embodiments, the forming wedge 280 may include a forming wedge vacuum tube 288 in fluid communication with the support material of the forming surface support 281. The forming wedge vacuum tube 288 may be fluidly coupled to a vacuum system (not shown), such as a vacuum pump or Venturi system. The vacuum system may be operable to create a vacuum within the forming wedge vacuum tube 288 and within the support material of the forming surface support 281.

The forming wedge 280 may further include the first outer wall 284 coupled to an outer surface of the forming surface support 281 at the first side 206 of the forming body 200. The first outer wall 284 may extend from the first conduit outer wall 212 to the root 274. The first outer wall 284 may be coupled to the first conduit outer wall 212 proximate the first slot 220. The first outer wall 284 may provide the first forming surface 270 extending from the first slot 220 to the root 274 on the first side 206 of the forming body 200. The forming wedge 280 may further include the second outer wall 286 coupled to an outer surface of the forming surface support 281 at the second side 208 of the forming body 200. The second outer wall 286 may be disposed on a side of the forming surface support 281 opposite the first outer wall 284. The second outer wall 286 may extend from the first conduit outer wall 212 to the root 274. The second outer wall 286 may be coupled to the first conduit outer wall 212 proximate the second slot 222. The second outer wall 286 may provide the second forming surface 272 extending from the second slot 222 to the root 274 on the second side 208 of the forming body 200.

The first outer wall 284 and/or the second outer wall 286 may be constructed of a refractory metal capable of withstanding the temperatures experienced during formation of the continuous laminate glass ribbon 102 without degrading or reacting with the constituents of the first molten glass 211 or the second molten glass 231. The refractory metal may be platinum or a platinum-containing metal such as but not limited to platinum-rhodium, platinum-iridium and combinations thereof. Such refractory metals may also include molybdenum, palladium, rhenium, tantalum, titanium, tungsten, ruthenium, osmium, zirconium, and alloys thereof and/or zirconium dioxide. In some embodiments, the first conduit wall 212, the second conduit wall 232, or both, may be platinum or a platinum-alloy.

Referring to FIG. 3, the forming bodies 200 may include side dams 290 to control the flows of the first molten glass 211 and the second molten glass 231 down the outer surfaces of the forming body 200. The side dams 290 can be made with an angle to vertical configured to accelerate the initial wetting, reduce the start-up time, and control lateral flow attenuation on the negatively inclined surface of the forming body 200. In some embodiments, the angle of the side dams 290 can be from 0 degrees to 3 degrees. The forming bodies 200 disclosed herein may also include two pier blocks 292 configured to support the first conduit 210 and the second conduit 230 simultaneously. The pier blocks 292 may be constructed of a material, such as a ceramic material or other refractory material, that is capable of withstanding the thermal gradients and high operating temperatures experienced during formation of the continuous laminate glass ribbon 102. In some embodiments, the pier blocks 292 may be mullite.

Referring to FIGS. 4 and 5, general operation of the forming bodies 200 of the present disclosure will now be described. The first molten glass 211 may be produced in the first molten glass system 110 (FIG. 1), and the second molten glass 231 may be produced in the second molten glass system 150 (FIG. 1), as previously described herein. The first molten glass 211 may be passed from the first delivery vessel 136 (FIG. 1) to the first inlet 202 through the first downcomer 138, which is coupled to the first delivery vessel 136 such that a free surface of the first molten glass 211 is not created between the first delivery vessel 136 and the first downcomer 138. The second molten glass 231 may be passed from the second delivery vessel 176 (FIG. 1) to the second inlet 204 through the second downcomer 178, which is coupled to the second delivery vessel 176 such that a free surface of the second molten glass 231 is not created between the second delivery vessel 176 and the second downcomer 178. The first downcomer 138 and the second downcomer 178 may each include one or a plurality of heat exchangers (not shown) for controlling the temperature of the first molten glass 211 and the second molten glass 231 passing through the first downcomer 138 and second downcomer 178, respectively.

As previously discussed, the forming body 200 comprising a first conduit 210 and a second conduit 230, as described herein, may enable the glass flow rate and viscosity to be adjusted independently for each of the first molten glass 211 and the second molten glass 231. This independent control of the glass flow rate and viscosity may result from changing pressures of the first molten glass 211 and second molten glass 231 at the first inlet 202 and the second inlet 204, respectively. The pressure of the first molten glass 211 at the first inlet 202 of the forming body 200 may be adjusted by manipulating the glass temperature of the first molten glass 211 at one or more positions along the first downcomer 138. The pressure of the second molten glass 231 at the second inlet 202 of the forming body 200 may be adjusted by manipulating the glass temperature of the second molten glass 231 at one or more positions along the second downcomer 178. Thus, controlling the temperature of the molten glass in the downcomers may control the pressure at the inlet to the forming body, which may enable the glass flow rate and glass viscosity to be varied independently for each molten glass flow.

Referring still to FIGS. 4 and 5, the first molten glass 211 may be passed from the first molten glass system 110 to the first conduit 210 through the first inlet 202 of the forming body 200. The first molten glass 211 may flow through the first conduit 210 from the first conduit inlet end 217 to the first conduit compression end 218. Referring to FIG. 4, the first molten glass 211 may flow through the first slot 220 in the first conduit wall 212 and may merge into a flow of the first molten glass 211 flowing down the first side 206 of the forming body 200. The flow of the first molten glass 211 through the first slot 220 may flow generally downward (i.e., in the −Z direction of the coordinate axis of FIG. 4) along the first forming surface 270 to the root 274. In some embodiments, the first molten glass 211 may also flow through a second slot 222 in the first conduit wall 210 and may merge with a second flow of the first molten glass 211 flowing down the second side 208 or the forming body 200. The flow of the first molten glass 211 through the second slot 222 may flow generally downward along the second forming surface 272 to the root 274. At the root 274, the two flows of the first molten glass 211 may fuse together to form a single molten glass layer, which may be a core layer 104 of the continuous laminate glass ribbon 102.

The second molten glass 231 may be passed from the second molten glass system 150 to the second conduit 230 through the second inlet 204 of the forming body 200. The second molten glass 231 may flow through the second conduit 230 from the second conduit inlet end 237 to the second conduit compression end 238. In some embodiments, the flow of the second molten glass 231 through the second conduit 230 may be in a direction counter to the flow direction of the first molten glass 211 through the first conduit 210. Referring to FIG. 4, the second molten glass 231 may flow through the at least one slot 240 in the second conduit wall 232. Upon exiting the slot 240, the second molten glass 231 may merge into two flows of the second molten glass 231 flowing over the outer surface 234 of the second conduit wall 232; one flow of the second molten glass 231 flowing down the first side 206 of the forming body 200 and the other flow of the second molten glass 231 flowing down the second side 208 of the forming body 200. The two flows of the second molten glass 231 may flow downward (i.e., in the −Z direction of the coordinate axis in FIG. 4) along the first vertical wall 250 and the second vertical wall 260, respectively. Proximate the first slot 220 and the second slot 222, respectively, the two flows of the second molten glass 231 may each contact an outer surface of a flow of the first molten glass 211. Upon contact, the flow of the second molten glass 231 may fuse to the flow of the first molten glass 211. The second molten glass 231 may flow with the first molten glass 211 down the first forming surface 270 and second forming surface 272 to the root 274. The flows of the second molten glass 231 may form clad layers 106 of the continuous laminate glass ribbon 102. In some embodiments, the core layer 104 of the first molten glass 211 may be disposed between the two clad layers 106 comprising the second molten glass 231.

The continuous laminate glass ribbon 102 may be drawn from the root 274 by a pulling device (not shown) and may be passed to one or more downstream processes (not shown) for further processing the continuous laminate glass ribbon 102. For example, the continuous laminate glass ribbon 102 may be passed through an annealing furnace to anneal the continuous laminate glass ribbon 102. The continuous laminate glass ribbon 102 may also be passed to a cutting and separating operation in which the continuous laminate glass ribbon 102 is separated into a plurality of laminate glass sheets.

Referring now to FIGS. 8A-8D, various slot positions and configurations may be implemented in the forming bodies 200 described herein to produce different continuous laminate glass ribbons 102. Referring to FIG. 8A, as previously discussed, in some embodiments, the first conduit 210 may include the first slot 220 on the first side 206 of the forming body 200 and the second slot 222 on the second side 208 of the forming body 200, and the second conduit 230 may include a single slot 240. The slot 240 of the second conduit 230 may extend through the second conduit wall 232 at a uppermost portion of the second conduit wall 232 so that molten glass flowing through the at least one slot 240 in the second conduit wall 232 flows down the first side 206 and the second side 208 of the forming body 200. The second conduit 230 having a single slot 240 may allow for an overflow region on the topmost surface 244 of the second conduit wall 232 where the gravity and surface tension of the second molten glass 231 can smooth out small perturbations of the glass enabling a fusion-quality pristine surface.

For continuous laminate glass ribbons 102 that are symmetrical, the single slot 240 may deliver the same amount of the second molten glass 231 to the first side 206 and second side 208 of the forming body 200, which may form clad layers 106 having the same thickness, independent of small process variations. These small process variations, such as variations in temperatures at different points along the outer surface 234 of the second conduit 230, cross-tilt of the forming body 200, or other process variations, may result in differences in thickness between the two clad layers formed from the flows of the second molten glass 231 down each side of the forming body 200. The shape of the outer surface 234 of the topmost portion of the second conduit wall 230 may have an impact on the sensitivity of the second conduit wall 230 to these small process variations.

Figure 9:
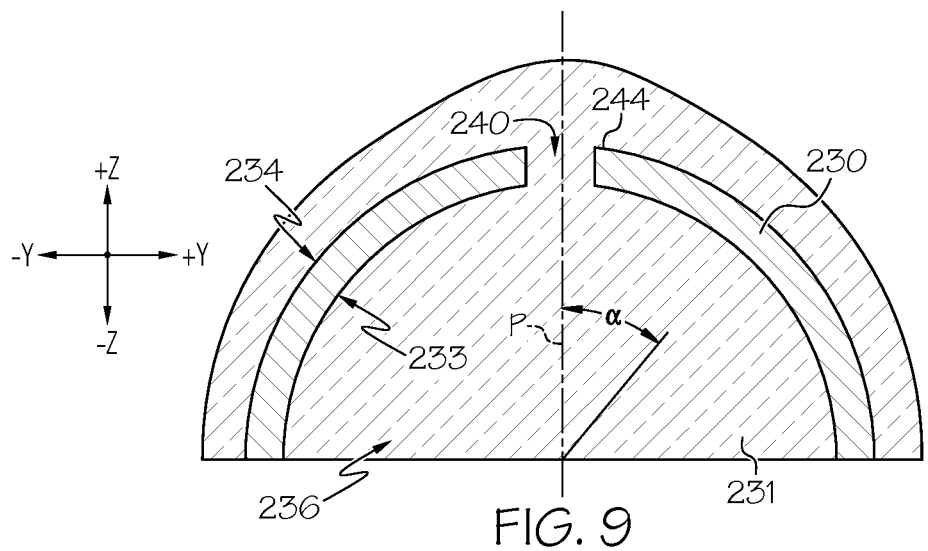
FIG. 9 schematically depicts a cross-sectional view of a slot in a second conduit of the forming body of FIG. 3, according to one or more embodiments shown and described herein.
Figure 10:
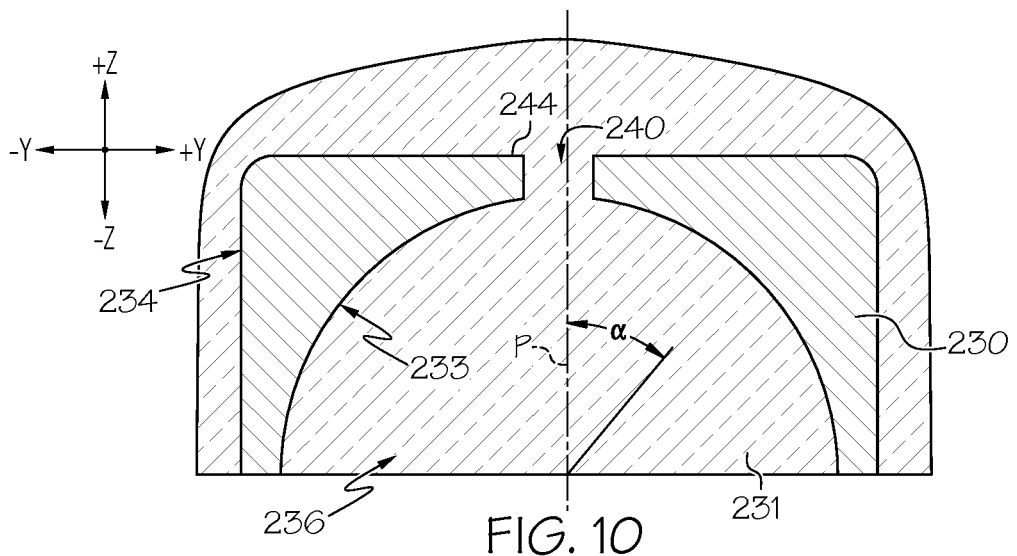
FIG. 10 schematically depicts a cross-sectional view of another embodiment of a second conduit of the forming body of FIG. 3, according to one or more embodiments shown and described herein.
Figure 11:
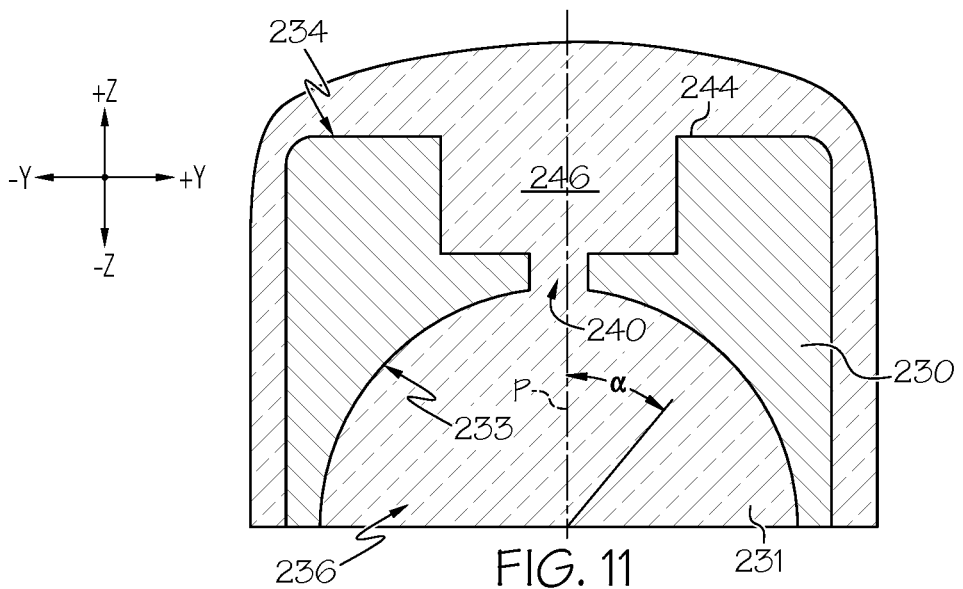
FIG. 11 schematically depicts a cross-sectional view of still another embodiment of a second conduit of the forming body of FIG. 3, according to one or more embodiments shown and described herein.

Referring to FIG. 9, in some embodiments, the topmost surface 244 of the second conduit 230 may have a rounded or semi-circular shape. In these embodiments, the second molten glass 231 may pass through the slot 240 in the topmost surface 244 and merge into two separate flows, each of which may flow down the curved contour of the topmost surface 244. Referring now to FIG. 10, in some embodiments, the topmost surface 244 of the second conduit 230 may be more angular or square-shaped having a flat portion on either side of the slot 240 and a sharper corner at each side of the second conduit 230. In these embodiments, the second molten glass 231 may pass through the slot 240 and merge with the glass flows that propagate laterally from either side of the slot 240. The two separate glass flows each travel laterally along the topmost surface 244, which is generally flat, and then over the corner to travel down the first side 206 and second side 208 of the forming body 200. Referring to FIG. 11, in still other embodiments, the topmost surface 244 of the second conduit 230 may include a trough 246 defined between two weirs, which resembles the geometry of an overflow isopipe. In these embodiments, the second molten glass 231 may pass through the slot 240 up into the trough 246. The second molten glass 231 may fill the trough and overflow the two weirs to flow down the first side 206 and second side 208 of the forming body 200.

Figure 12:
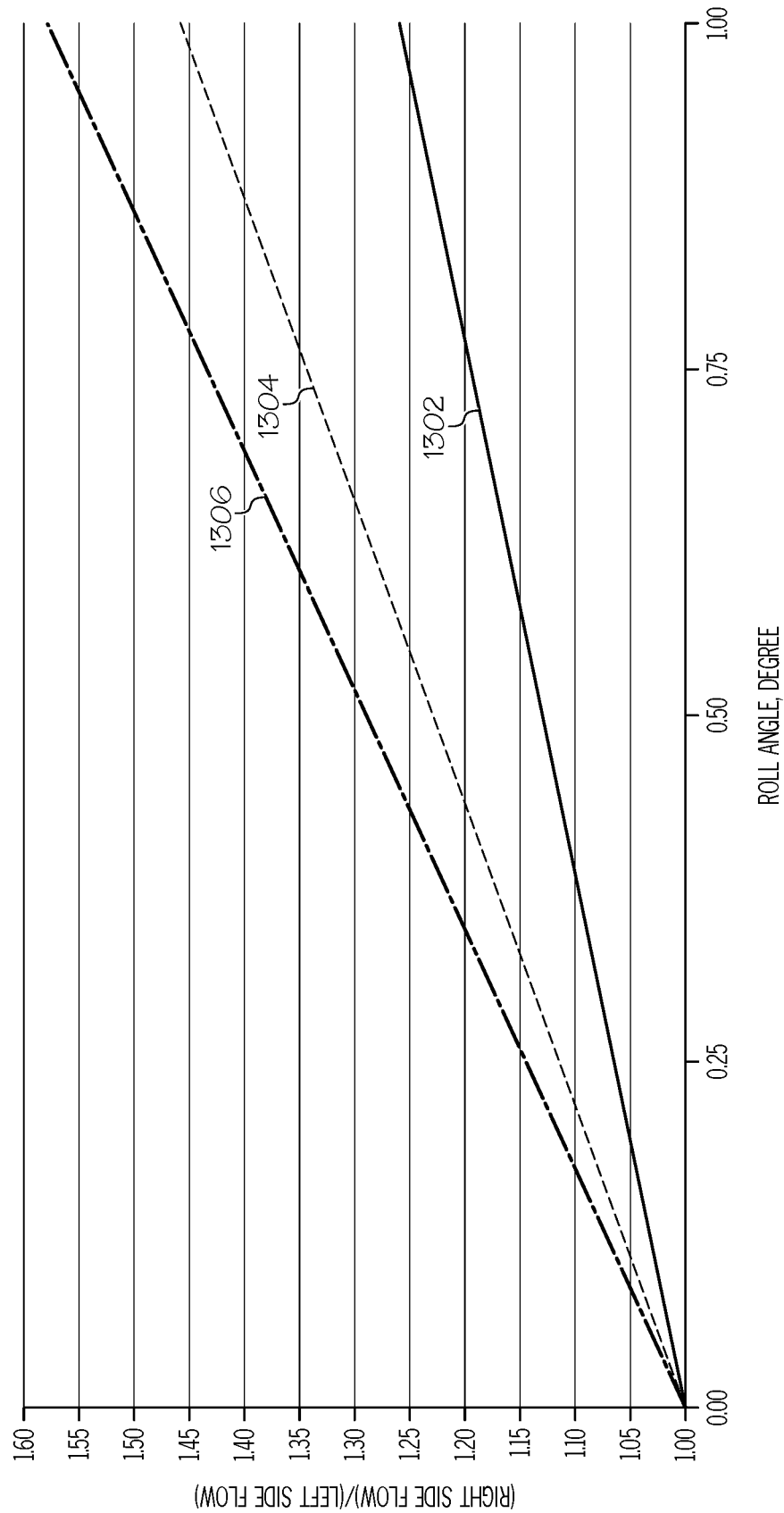
FIG. 12 graphically depicts a plot of a ratio of flow over a first side of the forming body to the flow over a second side of the forming body for the second conduit (y-axis) as a function of roll angle (x-axis) for the second conduit configurations schematically depicts in FIGS. 9, 10, and 11, according to one or more embodiments shown and described herein.

Each of the shapes of the topmost surface 244 of the second conduit 230 in FIGS. 9, 10, and 11 may have a different sensitivity to small process variations, such as cross-tilt for example. Referring to FIG. 12, the sensitivity of each of the second conduits 230 in FIGS. 9, 10, and 11 to cross-tilt of the forming body 200 is graphically depicted. Cross-tilt of the forming body refers to tilting or rolling of the second conduit relative to an axis parallel to the x-axis in the figures (e.g., rotation or pivoting of the second conduit 230 of the forming body 200 in FIG. 3 relative to an axis parallel with the X axis of FIG. 3). FIG. 12 depicts the ratio of the right side flow (first side 206) divided by the left side flow (second side 208) as a function of tilt angle $\alpha$, which is an angle by which the second conduits 230 in FIGS. 9-11 are tilted towards the right side in the figures. Reference number 1302 corresponds to the sensitivity of the second conduit 230 of FIG. 9 having a rounded topmost surface 244, reference number 1304 corresponds to the sensitivity of the second conduit 230 of FIG. 10 having a flat topmost surface 244, and reference number 1306 corresponds to the sensitivity of the second conduit 230 of FIG. 11 having the trough 246. At a tilt angle $\alpha$ of zero, the ratio of right side flow to left side flow is equal to 1 for each of the second conduits in FIGS. 9-11. As shown in FIG. 12, the rounded contour of the second conduit 230 in FIG. 9 (ref 1302) provides the least sensitivity to cross-tilt of the second conduit 230, as shown by the lesser slope of line 1302 compared to the slopes of lines 1304 and 1306. In other words, in response to a unit change in the cross-tilt angle $\alpha$ of the second conduit 230, the rounded contour of the second conduit in FIG. 9 results in the least change in the distribution of the second molten glass 231 between the right side and the left side of the forming body 200 compared to the shapes in FIGS. 10 and 11. Having a more rounded contour to the topmost surface 244 of the second conduit wall 232 of the second conduit 230 may, therefore, be less sensitive to small process variations, such as cross-tilt, temperature variations or other variations, compared to topmost surfaces 244 that are flat or have a trough 246.

Referring now to FIG. 8B, in some embodiments, the first conduit 210 may include the first slot 220 on the first side 206 of the forming body 200 and the second slot 222 on the second side 208 of the forming body 200. Additionally, the second conduit 230 may include a first slot 241 extending through the second conduit wall 232 at the first side 206 of the forming body 200 and a second slot 242 extending through the second conduit wall 232 at the second side 208 of the forming body 200. In some embodiments, the first slot 241 may have a different slot width $W_S$ profile than the second slot 242, which may enable different flow rates of the second molten glass 231 down the first side 206 and the second side 208 of the forming body 200. This may enable a continuous laminate glass ribbon 102 to be formed having a first clad layer 105 and a second clad layer 107 having a thickness different from the first clad layer 105. In some embodiments, the first slot 241 and the second slot 242 in the second conduit 230 may have the same slot width $W_S$ profile so that the thickness of the first clad layer 105 is the same as the thickness of the second clad layer 107.

Referring now to FIG. 8C, in some embodiments, the first conduit 210 may include the first slot 220 and the second slot 222, and the second conduit 230 may include the single slot 240 passing through the second conduit wall 232 proximate the first side 206 or the second side 208 of the forming body 200. The forming body 200 of FIG. 8C may be operable to produce a continuous laminate glass ribbon 102 having two glass layers, such as a first layer 108 and a second layer 109. The relative thicknesses of the first layer 108 and the second layer 109 may be modified by changing the slot width $W_S$ profile of the slot 240, the first slot 220, or the second slot 222.

Referring now to FIG. 8D, in some embodiments, the first conduit 210 may include only a single slot, such as the first slot 220 or the second slot 222, but not both, and the second conduit 230 may include the single slot 240 positioned at a side of the forming body opposite the single slot in the first conduit 210. For example, in some embodiments, the first conduit 210 may include the first slot 220 extending through the first conduit wall 212 at the first side 206 of the forming body 200, and the single slot 240 may extend through the second conduit wall 232 proximate the second side 208 of the forming body 200. In this configuration, the first molten glass 211 passing through the first slot 220 in the first conduit 210 may travel downward along the first forming surface 270 to the root 274, and the second molten glass 231 passing through the single slot 240 in the second conduit 230 flows downward (in the −Z direction of the coordinate axis in FIG. 8D) along the second vertical wall 260 and second forming surface 272 to the root 274. At the root 274, the flow of the second molten glass 231 may contact the flow of the first molten glass 211. The second molten glass 231 and the first molten glass 211 may fuse together at the root 274 to produce the continuous laminate glass ribbon 102 having two glass layers, such as first glass layer 108 and second glass layer 109. The relative thicknesses of the first glass layer 108 and the second glass layer 109 may be modified by changing the shape of the single slot 240 in the second conduit 230, the shape of the slot (e.g., first slot 220 or second slot 222) in the first conduit 210, or both.

Referring again to FIGS. 6A and 6B, in some embodiments, the at least one slot 240 in the second conduit 230 may have the same slot length $L_S$ as the first slot 220 and the second slot 222 in the first conduit 210. In other embodiments, the at least one slot 240 in the second conduit 230 may have a slot length $L_S$ different from the slot length $L_S$ of the first slot 220 and second slot 222 in the first conduit 210. For example, in some embodiments, the slot 240 in the second conduit 230 may have a slot length $L_S$ that is greater than the slot length $L_S$ of the first slot 220 and second slot 222 in the first conduit 210, which may produce a continuous laminate glass ribbon 102 in which the core glass layer 104 (FIG. 4) is completely enclosed by the clad glass layers 106 (FIG. 4). Alternatively, in some embodiments, the slot 240 in the second conduit 230 may have a slot length $L_S$ that is less than the slot length $L_S$ of the first slot 220 and second slot 222 in the first conduit 210, which may produce a continuous laminate glass ribbon 102 in which only a center portion of the continuous laminate glass ribbon 102 will be a laminate. In some embodiments, a continuous glass ribbon may be formed to have both laminated sections and single layer non-laminated sections. Alternating sections of laminate and non-laminate regions in the glass ribbon can be accomplished by using non-continuous perforated slots for the slot 240 in the second conduit 230 or for the first slot 220 and second slot 222 in the first conduit 210. Perforated slots are previously discussed herein and further information on perforated slots can be found in U.S. Provisional Patent Application No. 62/717,173, filed on Aug. 10, 2018, the entire contents of which were previously incorporated by reference herein in their entirety.

Figure 13:
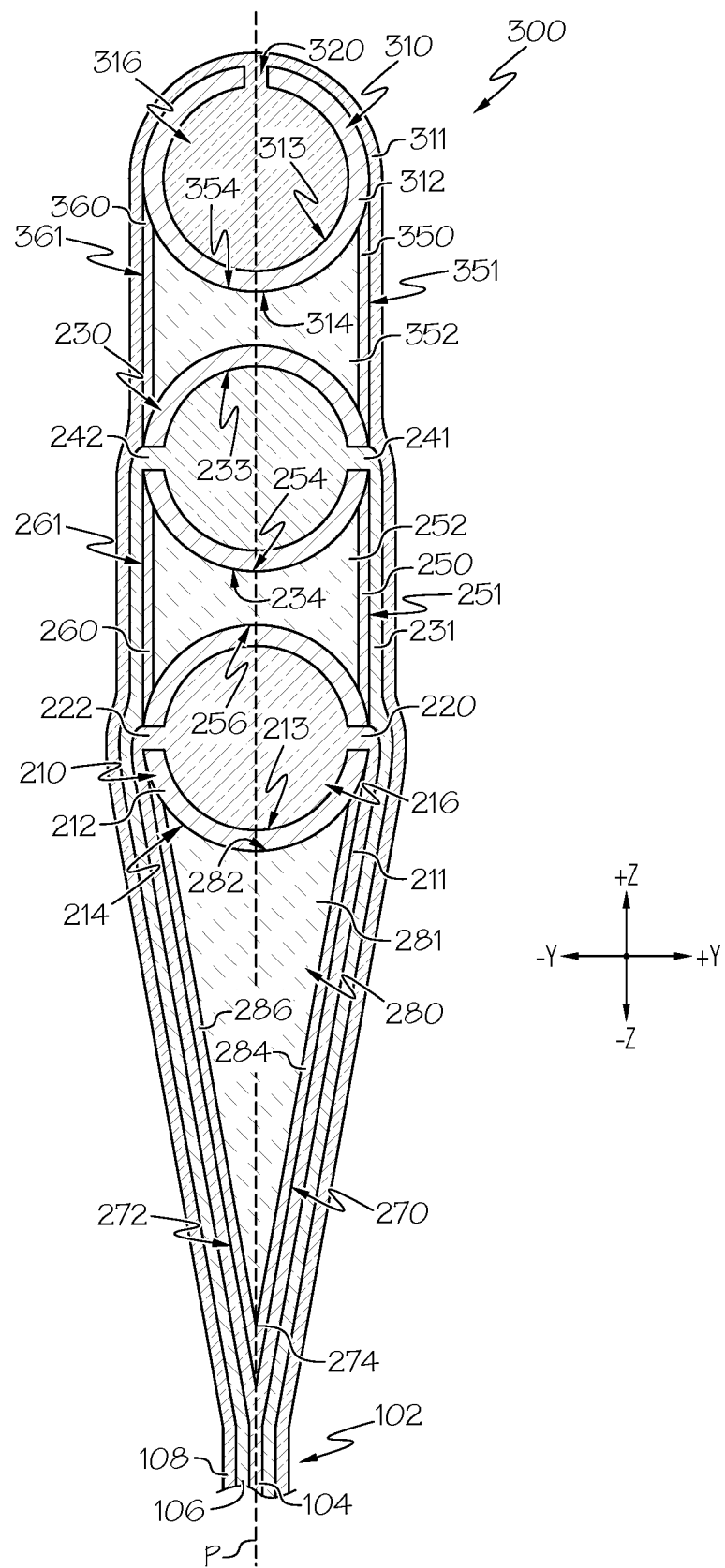
FIG. 13 schematically depicts a cross-sectional view of another forming body for use with the laminate glass forming apparatus of FIG. 1, according to one or more embodiments shown and described herein.

Referring now to FIG. 13, the forming bodies disclosed herein, such as forming body 300, can be adapted to add additional glass layers to the continuous laminate glass ribbon 102 by including one or a plurality of supplemental conduits 310. In some embodiments, the forming body 300 may include at least one supplemental conduit 310 disposed above (i.e., in the +Z direction of the coordinate axis of FIG. 13) and vertically aligned with the first conduit 210 and the second conduit 230. The forming body 300 may include 1, 2, 3, 4, or more than 4 supplemental conduits 310 for forming a continuous laminate glass ribbon 102 having a plurality of different glass layers. The supplemental conduit 310 may include a supplemental conduit wall 312 having an interior surface 313 defining a supplemental region 316. The supplemental conduit 310 may further include at least one slot 320 extending through the supplemental conduit wall 312. The at least one slot 320 of the supplemental conduit 310 may have a longest dimension (e.g., slot length $L_S$) aligned with a direction of flow of a supplemental molten glass 311 through the supplemental conduit 310. Although shown as having a single slot 320, in some embodiments, the supplemental conduit 310 may include a first slot proximate the first side 206 of the forming body 300 and a second slot proximate the second side 208 of the forming body 300. The supplemental conduit 310 may have any of the other features, properties, or characteristics previously described herein in relation to the first conduit 210 and/or the second conduit 230.

The forming body 300 may also include a plurality of supplemental vertical walls, such as a first supplemental vertical wall 350 and a second supplemental vertical wall 360, extending vertically (i.e., in the +/−Z direction of the coordinate axis of FIG. 4) between the outer surface 234 of the second conduit 230 and an outer surface 314 of the at least one supplemental conduit 310. An outer surface 351 of the first supplemental vertical wall 350 and an outer surface 361 of the second supplemental vertical wall 360 may provide continuous surfaces over which the flows of the supplemental molten glass 311 from the supplemental conduit 310 can flow from the outer surface 314 of the supplemental conduit wall 312 into contact with the second molten glass 231 from the second conduit 230 and/or the first molten glass 211 from the first conduit 210. Thus, the first supplemental vertical wall 350 and the second supplemental vertical wall 360 may eliminate any gaps or air pockets between the flow of the supplemental molten glass 311 and the forming body 300 before confluence of the flows of supplemental molten glass 311 with the flows of the first molten glass 211 and/or second molten glass 231.

The first supplemental vertical wall 350 and second supplemental vertical wall 360 may have any of the other features, properties, or characteristics previously described herein for the first vertical wall 250 and the second vertical wall 260, respectively. The forming body 300 may additionally include a supplemental conduit support 352 disposed between the second conduit 230 and the supplemental conduit 310. The supplemental conduit support 352 may have an upper surface 354 configured to support the supplemental conduit 310 and a lower surface 356 configured to support the upper portion of the second conduit 230. The supplemental conduit support 352 may have any of the other features, properties, or characteristics previously described herein for the conduit support 252.

The supplemental conduit 310 may be fluidly coupled to a supplemental molten glass system (not shown) for delivery the supplemental molten glass 311 to the supplemental conduit 310. Operation of the supplemental conduit 310 may be similar to operation of the first conduit 210 and second conduit 230, which was previously described herein. In some embodiment, the forming body 300 may include a plurality of supplemental conduits 310 and a plurality of supplemental vertical walls (e.g., a plurality of first supplemental vertical walls 350 and second supplemental vertical walls 360), each of which extending between two of the plurality of supplemental conduits 310 or between one of the supplemental conduits 310 and the second conduit 230. Based on the previous description of the first conduit 210 and the second conduit 230, it is understood that various configurations the supplemental slots 320 in the supplemental conduits 310 are possible for providing a wide range of different continuous laminate glass ribbons 102. These various slot configurations for the supplemental slots 320 in the supplemental conduits 310 are considered to be covered by present disclosure.

Figure 14A:
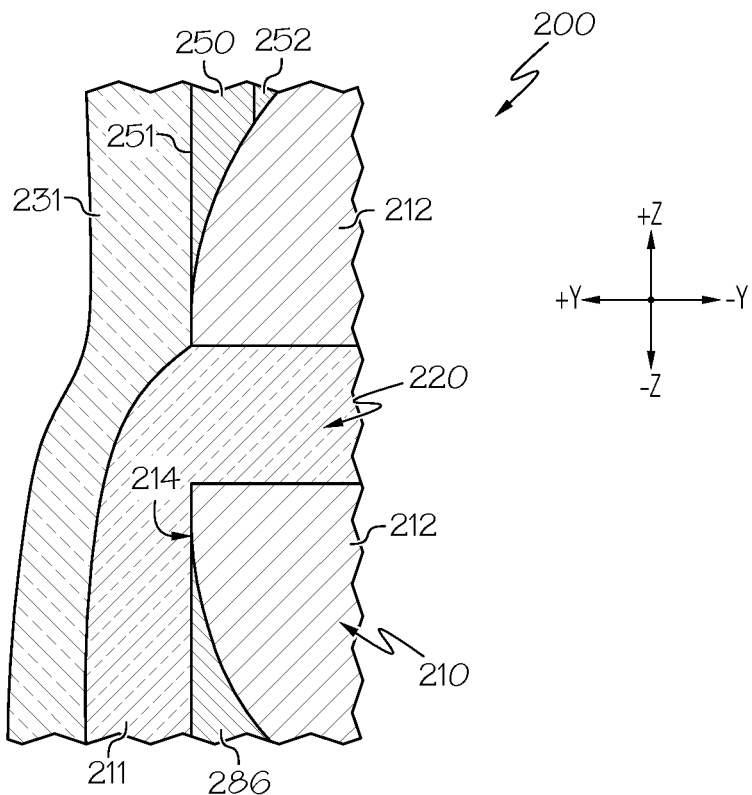
FIG. 14A schematically depicts a cross-sectional view of a portion of the forming body of FIG. 3 proximate a first slot in a first conduit, according to one or more embodiments shown and described herein.
Figure 14B:
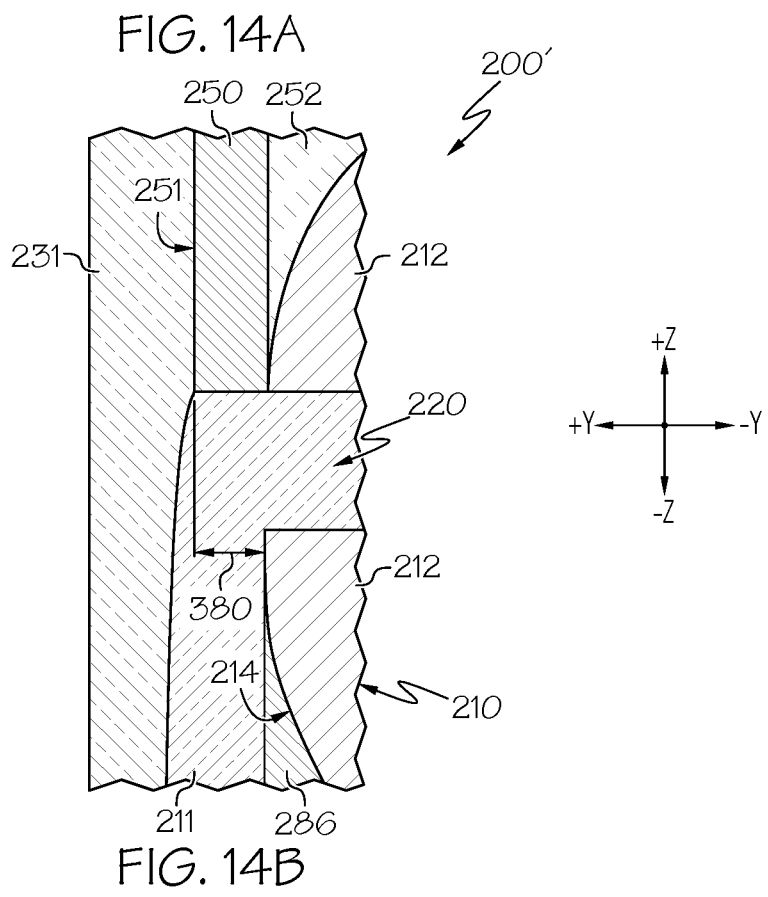
FIG. 14B schematically depicts a cross-sectional view of a portion of another forming body proximate a first slot in a first conduit, the forming body having a vertical offset between the first conduit and a first vertical wall, according to one or more embodiments shown and described herein.

Referring to FIG. 14A, in some embodiments, the first vertical wall outer surface 251 may be vertically aligned (e.g., aligned in the +/−Z direction of the coordinate axis of FIGS. 14A and 14B) with the outer surface 214 of the first conduit wall 212 at the first slot 220. Additionally, on the second side 208 of the forming body 200, the second vertical wall outer surface 261 may be vertically aligned with the outer surface 214 of the first conduit wall 212 at the second slot 222. When the first vertical wall outer surface 251 and the second vertical wall outer surface 261 are vertically aligned with the outer surface 214 of the first conduit wall 212 at the first slot 220 and the second slot 222, respectively, the first molten glass 211 flowing out from the first slot 220 and/or the second slot 222 may cause the flow of the second molten glass 231 to deform outward from the forming body 200 at the confluence of the second molten glass 231 and the first molten glass 211. This outward deformation of the second molten glass 231 may cause defects in the core or clad glass layers. For example, the second molten glass 231 may exert a pressure on the flow of the first molten glass 211 through contact of the flow of the second molten glass 231 with the first molten glass 211 at the confluence.

Referring to FIG. 14B, in some embodiments, the first vertical wall outer surface 251 may be vertically offset from the outer surface 214 of the first conduit wall 212, which may provide space for the first molten glass 211 to flow out of the first slot 220 with minimal deformation of the flow of the second molten glass 231 at the confluence. The vertical offset may provide smooth and stable confluence of the first molten glass 211 and second molten glass 231 proximate the first slot 220 and/or the second slot 222. The vertical offset may reduce the force of the contact between the flow of the second molten glass 231 and the flow of the first molten glass 211 at the confluence of the second molten glass 231 with the first molten glass 211. In some embodiments, the first vertical wall outer surface 251 may be spaced horizontally outward relative to the outer surface 214 of the first conduit wall 212 at the first slot 220 by an offset distance 380 to form the vertical offset between the first vertical wall outer surface 251 and the outer surface 214 of the first conduit wall 212. The second vertical wall outer surface 261 may also be vertically offset from the outer surface 214 of the first conduit wall 212 at the second slot 222. In some embodiments, the second vertical wall outer surface 261 may be spaced horizontally outward relative to the outer surface 214 of the first conduit wall 212 at the second slot 222 by an offset distance 380 to form the vertical offset between the second vertical wall outer surface 261 and the outer surface 214 of the first conduit wall 212. The offset distance 380 may be less than or equal to a thickness of a flow of the first molten glass 211 down the first forming surface 270 or the second forming surface 272. In some embodiments the offset distance 380 may be less than or equal to half the thickness of the core glass layer 104 produced by the forming body 200 of FIG. 4. The vertical offset may be configured so that deformation of the second molten glass 231 flow from the second conduit 230 can be reduced at the confluence.

The present disclosure focuses on aspects of the forming body 200, 300; however, it is understood that the glass forming apparatus 100 may include various other components that aid in forming continuous laminate glass ribbons 102. For example, in some embodiments, the forming body 200, 300 may include a plurality of stacked and independently controlled furnaces surrounding the forming body 200, 300 to provide a controlled thermal environment. The plurality of furnaces may be referred to as a thermal muffle (not shown). The thermal muffle comprising a plurality of stacked and independently controlled furnaces may enable control of the delivery viscosities of the first molten glass 211 passing through the first slot 220 and the second slot 222 in the first conduit 210 and the second molten glass 231 passing through the at least one slot 240 in the second conduit 230. The thermal muffle may also enable control of the cooling curve to the root 274 and/or draw viscosity of the continuous laminate glass ribbon 102 at the exit of the thermal muffle. The thermal muffle may have various heating elements and internal features to facilitate heat transfer within the thermal muffle.

Below the thermal muffle, the glass forming apparatus 100 may additionally include edge-pulling devices to stabilize width and position of the continuous laminate glass ribbon 102 as it exits the muffle. The continuous laminate glass ribbon 102 may then be drawn through an annealing furnace to cool the glass temperature at an acceptable rate from exit viscosity to a temperature below the strain point. Finally, a pulling and cutting machine may be used to apply the downward pulling velocity to the glass, stabilize the glass position, and separate glass sheets from the end of the continuous laminate glass ribbon 102.

Referring again to FIGS. 4 and 5, a method of forming a continuous laminate glass ribbon 102 having a plurality of glass layers may include flowing the first molten glass 211 into the first conduit 210 in the forming body 200, 300. The first conduit 210 may include a first conduit wall 212 having an interior surface 213 defining a first region 216 and at least one slot (e.g., first slot 220 and/or second slot 222) extending through the first conduit wall 212 and in fluid communication with the first region 216. The at least one slot of the first conduit 210 may have a longest dimension (e.g., slot length $L_S$) aligned with a direction of flow of the first molten glass 211 through the first conduit 210. The method may further include passing the first molten glass 211 through the at least one slot in the first conduit wall 212 to merge with a first glass flow on a first side 206 of the forming body 200, 300, a second side 208 of the forming body 200, 300, or both. The method may further include flowing a second molten glass 231 into the second conduit 230 in the forming body 200, 300. The second conduit 230 may be positioned above and vertically aligned with (e.g., in the +/−Z direction of the coordinate axis of the figures) the first conduit 210 and comprising the second conduit wall 232 having the interior surface 233 defining a second region 236 and at least one slot 240 extending through the second conduit wall 232 and in fluid communication with the second region 236. The at least one slot 240 of the second conduit 230 may have a longest dimension (e.g., slot length $L_S$) aligned with a direction of flow of the second molten glass 231 through the second conduit 230. The method may further include passing the second molten glass 231 through the at least one slot 240 in the second conduit wall 232 to merge with a second glass flow on the first side 206 of the forming body 200, 300, the second side 208 of the forming body 200, 300, or both. The method may further include merging the second glass flow of the second molten glass 231 with the first glass flow of the first molten glass 211 to form the continuous laminate glass ribbon 102 having a plurality of molten glass layers fused together. The method may further include drawing the continuous laminate glass ribbon 102 downward (i.e., in the −Z direction of the coordinate axis of the figures) from the root 274 of the forming body 200.

In some embodiment, the method may include merging the second glass flow with the first glass flow at the root 274 of the forming body 200, 300. In other embodiments, the method may include merging the second glass flow of the second molten glass 231 with the first glass flow of the first molten glass 211 proximate the at least one slot (e.g., first slot 220 and/or second slot 222) in the first conduit wall 212 on the first side 206 of the forming body 200, 300, the second side 208 of the forming body 200, 300, or both. The first molten glass 211 may have a glass composition different from a glass composition of the second molten glass 231. In some embodiments, the first glass flow of the first molten glass 211 may form a core glass (e.g., core glass layer 104) and the second glass flow of the second molten glass 231 may form a clad glass (e.g., clad glass layer 106).

In some embodiments, the first conduit 210 may include the first slot 220 extending through the first conduit wall 212 at the first side 206 of the forming body 200, 300 and the second slot 222 extending through the first conduit wall 212 at the second side 208 of the forming body 200, 300. The method may further include passing the first molten glass 211 through the first slot 220 to merge with a first portion of the first glass flow on the first side 206 of the forming body 200, 300, passing the first molten glass 211 through the second slot 222 to merge with a second portion of first glass flow on the second side 208 of the forming body 200, 300, and merging the first portion of the first glass flow and the second portion of the first glass flow at the root 274 to form a fused layer of molten glass in a core glass layer 104 of the continuous laminate glass ribbon 102.

In some embodiments, the method may further include annealing the continuous laminate glass ribbon 102. In some embodiments, the method may further include separating the laminated glass ribbon into a plurality of laminated glass sheets.

In some embodiment, the methods of forming a continuous laminate glass ribbon 102 disclosed herein may further include flowing a third molten glass 311 into a third conduit 310 in the forming body 200, 300. The third conduit 310 may be positioned above and vertically aligned with the first conduit 210 and second conduit 230. The third conduit 310 may include a third conduit wall 312 having an interior surface 313 defining a third region 316 and at least one slot 320 extending through the third conduit wall 312 and in fluid communication with the third region 316. The at least one slot 320 of the third conduit 310 may have a longest dimension (e.g., slot length $L_S$) aligned with a direction of flow of the third molten glass 311 through the third conduit 310. The method may further include passing the third molten glass 311 through the at least one slot 320 in the third conduit wall 312 to merge with a third glass flow on a first side 208 of the forming body 200, 300, a second side 208 of the forming body 200, 300, or both. The method may further include merging the third glass flow with the second glass flow, the first gas flow, or both.

The glass forming apparatus 100, forming bodies 200, 300, and methods of the disclosure can provide a continuous laminate glass ribbon 102 having a plurality of glass layers, such as 2, 3, 4, 5, 6, or more than 6 glass layers. The continuous laminate glass ribbon 102 may be subsequently divided into laminate glass sheets. In some embodiments, the laminate glass sheets may be provided with four edges forming a parallelogram such as a rectangle (e.g., square), trapezoidal or other shape. In further embodiments, the laminate glass sheets may be a round, oblong, or elliptical glass sheet with one continuous edge. Other laminate glass sheets having two, three, five, etc. curved and/or straight edges may also be provided and are contemplated as being within the scope of the present description. Laminate glass sheets of various sizes, including varying lengths, heights, and thicknesses, are also contemplated. In some embodiments, an average thickness of the laminate glass sheets can be various average thicknesses between oppositely facing major surfaces of the glass sheet. In some embodiments, the average thickness of the laminate glass sheet can be greater than 50 micrometers (μm), such as from about 50 μm to about 1 millimeter (mm), such as from about 100 μm to about 300 μm although other thicknesses may be provided in further embodiments.

The laminate glass sheets can be used in a wide range of display applications such as, but not limited to, liquid crystal displays (LCDs), electrophoretic displays (EPD), organic light emitting diode displays (OLEDs), and plasma display panels (PDPs). The laminate glass sheets can also be formed into glass articles that can be used in various application, including, but not limited to, cover glass or glass backplane applications in consumer or commercial electronic devices including, for example, LCD and LED displays as previously discussed, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications such as photovoltaic cells; for architectural glass applications; for automotive or vehicular glass applications; or for commercial or household appliance applications. In various embodiments, a consumer electronic device (e.g., smartphones, tablet computers, personal computers, ultrabooks, televisions, and cameras), an architectural glass, and/or an automotive glass comprises a laminated glass sheet as described herein.

Based on the foregoing, it should now be understood that the embodiments described herein relate to forming bodies for use in glass forming apparatuses for producing continuous laminate glass ribbons and laminate glass sheets. The forming bodies described herein may be constructed to produce a continuous laminate glass ribbon. The forming bodies may provide for smooth and stable confluence of the various molten glass streams to reduce flow instabilities and air entrapment that may lead to defects in the continuous laminate glass ribbons 102. The forming bodies may also enable independent control of glass flow profiles and glass viscosities to broaden the range of combinations of glass compositions and thickness profiles able to be produced by the glass forming apparatus.

While various embodiments and techniques for producing continuous laminate glass ribbons have been described herein, it should be understood it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A forming body of a glass forming apparatus, the forming body comprising:
   a first conduit comprising a first generally cylindrical conduit wall having an interior surface defining a first region and at least one slot extending through the first generally cylindrical conduit wall and in fluid communication with the first region, the at least one slot of the first conduit having a longest dimension aligned with a direction of flow through the first conduit;
   a second conduit disposed above and vertically aligned with the first conduit, the second conduit comprising a second generally cylindrical conduit wall having an interior surface defining a second region and at least one slot extending through the second generally cylindrical conduit wall and in fluid communication with the second region, the at least one slot of the second conduit having a longest dimension aligned with a direction of flow through the second conduit;
   a first vertical wall extending between an outer surface of the second generally cylindrical conduit wall and an outer surface of the first generally cylindrical conduit wall at a first side of the forming body;
   a second vertical wall extending between the outer surface of the second generally cylindrical conduit wall and the outer surface of the first generally cylindrical conduit wall at a second side of the forming body; and
   a first forming surface and a second forming surface extending from the outer surface of the first generally cylindrical conduit wall, the first forming surface and the second forming surface converging at a root of the forming body.

2. The forming body of claim 1, wherein the at least one slot of the first conduit comprises a first slot extending through the first generally cylindrical conduit wall proximate the first side of the forming body and a second slot extending through the second generally cylindrical conduit wall proximate the second side of the forming body opposite the first side of the forming body.

3. The forming body of claim 1, wherein the at least one slot of the second conduit extends through the second generally cylindrical conduit wall at an uppermost portion of the second generally cylindrical conduit wall so that molten glass flowing through the at least one slot in the second generally cylindrical conduit wall flows down the first side and the second side of the forming body.

4. The forming body of claim 1, wherein the at least one slot of the second conduit comprises a first slot extending through the second generally cylindrical conduit wall at the first side of the forming body and a second slot extending through the second generally cylindrical conduit wall at the second side of the forming body.

5. The forming body of claim 1, wherein the at least one slot of the first conduit comprises a single slot disposed on the first side of the forming body and the at least one slot of the second conduit comprises a single slot disposed on the second side of the forming body opposite the first side.

6. The forming body of claim 1, wherein the first vertical wall, the second vertical wall, or both, are configured so that a second molten glass flow from the second conduit maintains contact with the forming body until the second molten glass flow contacts a first molten glass flow from the first conduit.

7. The forming body of claim 1, wherein the first vertical wall, the second vertical wall, or both are configured so that a second molten glass flow from the second conduit does not free fall over a distance between the second conduit and the first conduit.

8. The forming body of claim 1, wherein the first vertical wall outer surface is spaced horizontally outward relative to the outer surface of the first generally cylindrical conduit wall proximate the at least one slot in the first generally cylindrical conduit wall so that the first vertical wall outer surface is vertically offset from the outer surface of the first generally cylindrical conduit wall.

9. The forming body of claim 8, wherein a distance of the vertical offset is configured so that deformation of a second molten glass flow from the second conduit is reduced at a confluence of the second molten glass flow with a first molten glass flow from the first conduit.

10. The forming body of claim 8, wherein the vertical offset is less than or equal to a thickness of a core layer of a laminated glass sheet formed with the forming body.

11. The forming body of claim 1, wherein each of the at least one slot in the first generally cylindrical conduit wall, each of the at least one slot in the second generally cylindrical conduit wall, or combinations thereof, include a plurality of slots, wherein the plurality of slots are aligned along a linear path parallel to the flow direction of the first conduit or the second conduit, respectively.

* * * * *